United States Patent
Oakhill et al.

(10) Patent No.: US 9,265,352 B2
(45) Date of Patent: Feb. 23, 2016

(54) HEATING AND COOLING SLEEPING SYSTEM

(71) Applicants: Tim Oakhill, Houston, TX (US); Craig McAndrews, Houston, TX (US); Ken Bower, Houston, TX (US); Craig Miller, Houston, TX (US); Eric Johnson, Houston, TX (US); Michael Schmidt, Houston, TX (US); Lance Ellman, Houston, TX (US)

(72) Inventors: Tim Oakhill, Houston, TX (US); Craig McAndrews, Houston, TX (US); Ken Bower, Houston, TX (US); Craig Miller, Houston, TX (US); Eric Johnson, Houston, TX (US); Michael Schmidt, Houston, TX (US); Lance Ellman, Houston, TX (US)

(73) Assignee: Mattress Firm, Inc., Houston, TX (US)

(*) Notice: Subject to any disclaimer, the term of this patent is extended or adjusted under 35 U.S.C. 154(b) by 0 days.

(21) Appl. No.: 14/685,499

(22) Filed: Apr. 13, 2015

(65) Prior Publication Data
US 2015/0289667 A1    Oct. 15, 2015

Related U.S. Application Data

(60) Provisional application No. 61/978,659, filed on Apr. 11, 2014, provisional application No. 61/982,683, filed on Apr. 22, 2014.

(51) Int. Cl.
| | |
|---|---|
| A47C 21/04 | (2006.01) |
| A47C 27/15 | (2006.01) |
| A47C 20/04 | (2006.01) |
| A47C 27/08 | (2006.01) |
| A47C 27/18 | (2006.01) |

(52) U.S. Cl.
CPC .......... *A47C 21/044* (2013.01); *A47C 21/048* (2013.01); *A47C 27/15* (2013.01); *A47C 20/04* (2013.01); *A47C 27/085* (2013.01); *A47C 27/18* (2013.01)

(58) Field of Classification Search
CPC .......... A47C 7/74; A47C 7/742; A47C 7/744; A47C 7/748; A47C 20/04; A47C 21/04; A47C 21/042; A47C 21/044; A47C 21/048; A47C 27/085; A47C 27/15; A47C 27/18; A61G 2007/05784; A61G 2007/05792
See application file for complete search history.

(56) References Cited

U.S. PATENT DOCUMENTS

| | | |
|---|---|---|
| 3,266,064 A | 8/1966 | Figman |
| 4,449,261 A | 5/1984 | Magnusson |

(Continued)

FOREIGN PATENT DOCUMENTS

| | | |
|---|---|---|
| CN | 203207608 U | 9/2013 |
| EP | 0923897 B1 | 7/2003 |
| JP | 2010057750 A1 | 3/2010 |

OTHER PUBLICATIONS

International Search Report and Written Opinion dated Jul. 15, 2015 for PCT Application No. PCT/US2015/025589.

*Primary Examiner* — Nicholas Polito
(74) *Attorney, Agent, or Firm* — Haynes and Boone, LLP

(57) ABSTRACT

A sleeping system is described in which comfort systems for a foam mattress assembly are mounted in a foundation assembly supporting the mattress assembly. The comfort systems include an air heating and cooling system, a firmness system and an elevation system. The foam mattress assembly includes a flexible encasement dish into which one or more foam layers are disposed. Blowers for the air system are mounted adjacent the foundation assembly top in direct fluid communication with apertures in the top, minimizing the air flow path from the blower exhaust to the mattress top to reduce air pressure loss and diminishment of the heated or cooled air.

19 Claims, 14 Drawing Sheets

(56) References Cited

U.S. PATENT DOCUMENTS

| | | |
|---|---|---|
| 5,699,570 A * | 12/1997 | Wilkinson et al. ............ 5/713 |
| 6,336,237 B1 * | 1/2002 | Schmid ............ A47D 15/001 5/423 |
| 7,475,464 B2 | 1/2009 | Lofy et al. |
| 7,665,803 B2 | 2/2010 | Wolas |
| RE41,765 E | 9/2010 | Gregory et al. |
| 7,827,805 B2 | 11/2010 | Comiskey et al. |
| 7,877,827 B2 | 2/2011 | Marquette et al. |
| 7,963,594 B2 | 6/2011 | Wolas |
| 7,966,835 B2 | 6/2011 | Petrovski |
| 7,996,936 B2 | 8/2011 | Marquette et al. |
| 8,065,763 B2 | 11/2011 | Brykalski et al. |
| 8,181,290 B2 | 5/2012 | Brykalski et al. |
| 8,191,187 B2 | 6/2012 | Brykalski et al. |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,621,687 B2 | 1/2014 | Brykalski et al. |
| 8,732,874 B2 | 5/2014 | Brykalski et al. |
| 8,782,830 B2 | 7/2014 | Brykalski et al. |
| 8,893,329 B2 | 11/2014 | Petrovski et al. |
| 2006/0123553 A1 | 6/2006 | Jansen |
| 2009/0139033 A1 * | 6/2009 | Gladney ............ 5/716 |
| 2012/0131748 A1 | 5/2012 | Brykalski et al. |
| 2012/0227182 A1 | 9/2012 | Brykalski et al. |
| 2012/0244312 A1 | 9/2012 | Pearce et al. |
| 2013/0227783 A1 | 9/2013 | Brykalski et al. |
| 2014/0026318 A1 | 1/2014 | Bethel et al. |
| 2014/0026320 A1 | 1/2014 | Marquette et al. |
| 2014/0130516 A1 | 5/2014 | Lofy |
| 2014/0237719 A1 | 8/2014 | Brykalski et al. |

\* cited by examiner

HEATING AND COOLING SLEEPING SYSTEM

CROSS REFERENCE TO RELATED APPLICATIONS

The present application is a non-provisional application claiming priority to U.S. Provisional Application No. 61/978,659 filed Apr. 11, 2014 entitled "Heating and Cooling Sleeping System," and U.S. Provisional Application No. 61/982,683 filed Apr. 22, 2014 entitled "Heating and Cooling Sleeping System with Shroud." Each of these applications are incorporated herein by reference in their entirety, for all purposes.

BACKGROUND

1. Field of the Invention

The present disclosure relates generally to mattresses and support structures for the mattresses. In particular, the disclosure relates to specialized foam mattresses with comfort systems, such as air cooling and heating systems, firmness systems and elevation systems, wherein components of the comfort systems are disposed within an open space defined within a foundation that supports the mattresses.

2. Background

There are many applications and situations where it is desirable to provide systems for enhancing comfort or adjustability a loam mattress. For example, heating and/or cooling systems can be provided for adjusting the temperature of individual sleeping areas on a foam mattress to accommodate the preferences of different users. Many heating and cooling systems include air motor or blower for convective heating or cooling of the mattress. A foam mattress presents challenges for effectively and efficiently distributing the warmed or cooled air to an upper surface of the mattress. Air pressure losses and reductions in the temperature differential applied to the air delivered by the air blowers often frustrate the heating and cooling effects of the heating and cooling systems.

Other comfort systems may also be provided. For example, elevation mechanisms can be provided for selectively raising or lowering a head portion of the mattress to facilitate sleeping or other activities such as watching television. In some foam mattresses, a firmness layer is provided for selectively adjusting a firmness of one or more portions of the mattress. Still other mattresses are equipped with massage functionalities. Each of these systems can add to the complexity of operation for these systems. When these systems are combined in a single sleeping system, the movement or operation of one system may present challenges for the movement and operation of other systems.

BRIEF DESCRIPTION OF THE DRAWINGS

The disclosure is described in detail hereinafter on the basis of embodiments represented in the accompanying figures, in which.

DETAILED DESCRIPTION

Figure 1:
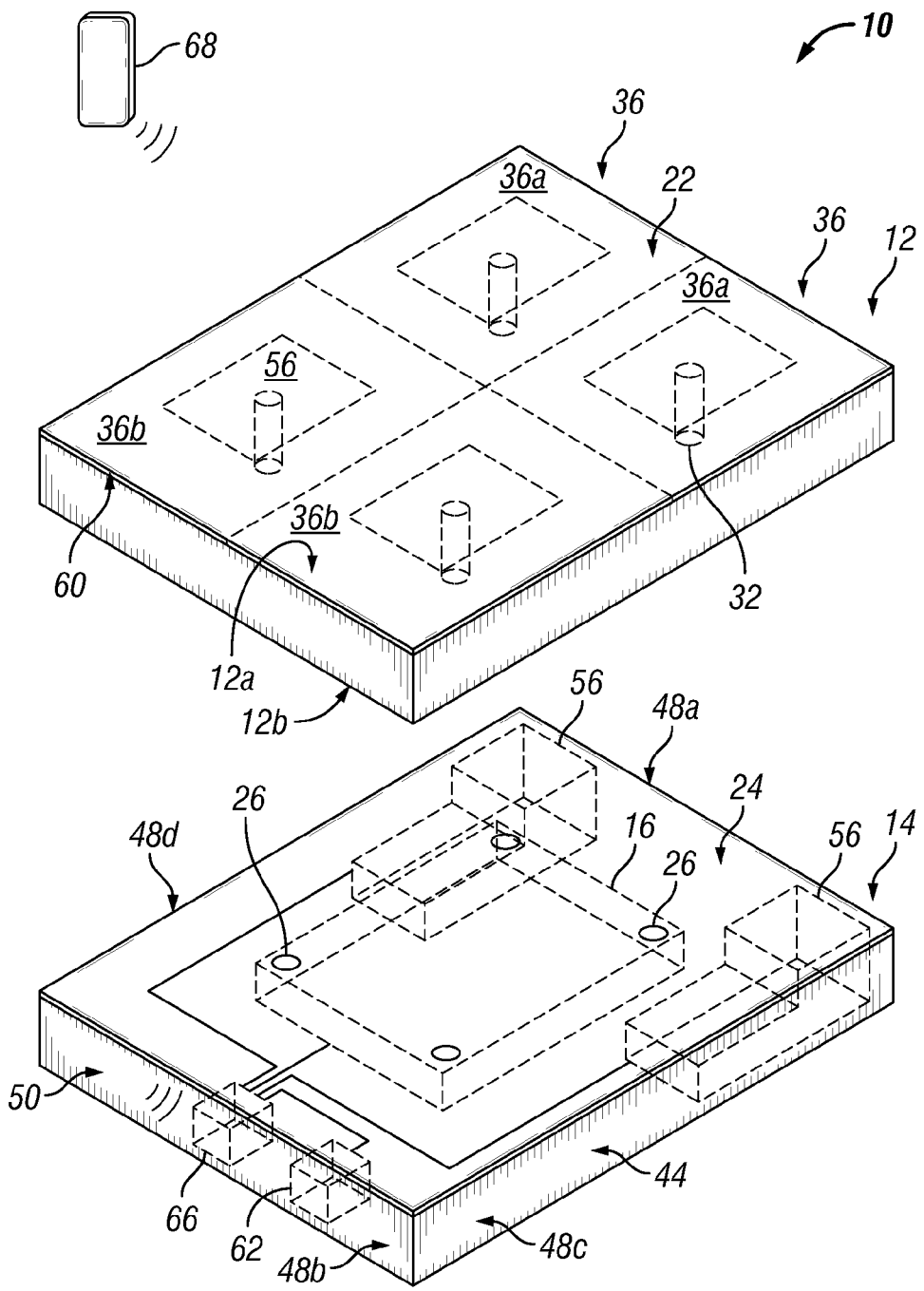
FIG. 1 is perspective schematic view of a sleeping system including a mattress supported by a foundation, with a heating and cooling subsystem, and elevation subsystem generally disposed within the foundation and operable with a wireless control device in accordance with example embodiments of the present disclosure.

In the interest of clarity, not all features of an actual implementation or method are described in this specification. Also, the "exemplary" embodiments described herein refer to examples of the present invention. In the development of any such actual embodiment, numerous implementation-specific decisions may be made to achieve specific goals, which may vary from one implementation to another. Such would nevertheless be a routine undertaking for those of ordinary skill in the art having the benefit of this disclosure. Further aspects and advantages of the various embodiments and related methods of the invention will become apparent from consideration of the following description and drawings.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

Mattress and Foundation

Referring to FIG. 1, a sleeping system 10 is illustrated in which an upper mattress assembly 12 is supported by a lower foundation assembly 14. The mattress assembly 12 defines a top 12a and a bottom 12b, and may be comprised of one or more foam layers. As used herein, "foam" includes any soft material such as rubber, plastic or polymer having bubbles or small cells (open cells or closed cells) defined therein, as commonly used in furniture and bedding applications. Sleeping system 10 also includes a heating and cooling system 16 having heating and cooling blowers/fans/motors 20 which may further include heating and cooling mechanisms 21 (FIG. 3) mounted in the foundation assembly 14. The blowers/fans/motors 20 provide heated and/or cooled air to an upper surface 22 of the upper mattress assembly 12. The blowers/fans/motors 20 are mounted adjacent or in close proximity to a top 24 of the foundation in direct fluid communication with apertures 26 formed in the top 24 of the foundation assembly 14, thereby minimizing the air flow path from the exhaust 30 (FIG. 3) of the blowers/fans/motors to the upper surface 22 of the mattress assembly 12, thus minimizing air pressure loss and diminishment of the heated or cooled air, as the case may be. This is in contrast to prior art systems (not shown) that utilize air hoses, tubing or ducting deployed in a base to distribute and deliver air from a central blowers/fans/motors location. Rather, each blowers/fans/motors 20 is positioned to be adjacent the foundation aperture 26 through which air passes from the foundation assembly 14 to the mattress assembly 12 (and aligned air passages 32 formed in the mattress assembly 12).

Mattress assembly 12 and foundation assembly 14 may be sized to have one or multiple sleeping areas 36, and each sleeping area 36 may have a head portion 36a adjacent one end of the mattress assembly 12 or foundation assembly 14 and a foot portion 36b adjacent the other end of the mattress assembly 12 or foundation assembly 14.

Each sleeping area 36 may have one or multiple fluid supply apertures 26 and corresponding air passages 32 associated therewith. An aperture 26 is provided in the top 24 of the foundation assembly 14 to be in fluid communication with the exhaust 30 of the air blowers/fans/motors 20. Likewise, an air passage 32 is provided through the upper mattress assembly 12, formed from aligned apertures or openings extending through the various layers as described below. The air passages 32 are disposed to be in fluid communication with the aperture 26 of the foundation assembly 14. In one or more embodiments, the apertures or openings are axially aligned. Similarly, the apertures or openings may be similarly sized and shaped, such as round, to facilitate formation of air passages 32. For sleeping systems 10 with foam mattresses 12 in which the head portions 36a and/or foot portions 36b have adjustable elevations, a flexible conduit 40 (FIGS. 4A and 4B), hose or tubing attaches between the aperture 26 of the foundation assembly 14 and the air passage 32 of the mattress assembly 12.

In preferred embodiments, the air intake 42 (FIG. 3) for the blowers/fans/motors 20 is oriented to be within an open space 44 defined by sides 48a, 48b, 48c, 48d (collectively sides 48), the top 24 and a sheath or bottom 50 of the foundation assembly 14, thereby drawing the intake air from the open space. While the top 24 and sides 48 of the foundation assembly 14 are enclosed, preferably the sheath or bottom 50 of the foundation assembly 14 is open to allow air to freely flow to the air intake 42. Alternatively, the bottom 50 of the foundation assembly 14 may be constructed with an air permeable covering or material. Alternatively, any covering on the bottom 50 of the foundation assembly 14 may include air intakes 52 (FIG. 5A) such as ports, slots or holes to permit air flow from outside of the foundation assembly 14 to the air intake(s) 52. Preferably, each blower/fan/motor 20 is in direct communication with its corresponding aperture 26. As used herein, "direct communication" means that an air blower/fan/motor 20 is positioned adjacent an aperture 26 so that the exhaust blows air into the aperture 26 as opposed to an intermediate air distribution system. Additionally, "direct communication" includes fittings on the exhaust that engage fittings in the aperture 26. The need for such direct communication is to avoid losses in the conditioned air as it is distributed through a distribution network (not shown) where cool air would tend to warm and warm air would tend to cool to equilibrium as it travels through such a distribution network.

The sleeping system 10 may also include within the open space 44, an elevation mechanism 56 for elevating a portion of the sleeping area 36. In the illustrated example embodiment, two elevation mechanisms 56 are illustrated, each disposed to raise a respective head portion 36a. In other exemplary embodiments, one or more elevation mechanisms 56 are additionally or alternatively disposed to elevate a part of the foot portion 36b. While the elevation mechanisms 56 for the head portion may be disposed to raise the outermost edge of the head portion 36b, an elevation mechanism 56 for actuating the foot portion 36b may be disposed to raise an intermediate area 58 of the foot portion 36b to a position above the outermost edge 60 of the foot portion 36b, so as to raise ones knees above ones feet. In another embodiment, each of the head portions 36a and foot portions 36b may include an elevation mechanism 56. Elevation mechanisms 56 are known in the art and the disclosure is not limited to a particular elevation mechanism 56. Illustrative elevation mechanisms are described briefly below with reference to FIGS. 4A and 4B.

In the illustrated embodiment, a firmness mechanism 62 may also be mounted in the open space 44 of the foundation assembly 14 for inflating and deflating one or more fluid bladders 64 (FIG. 2A) disposed in the mattress assembly 12. Firmness mechanism 62 may be pneumatic, using air or other gas, or hydraulic, using a liquid such as water, in fluid bladders 64 to facilitate adjustment of a firmness of the mattress assembly 12 as described in greater detail below.

Each of the heating and cooling systems 16, elevation mechanisms 56 and the firmness mechanism 62 is operatively coupled to a control unit 66 disposed within the open space 44. The control unit 66 is operable to transmit instructions and receive feedback from each of the heating and cooling system 16, the elevation mechanisms 56 and the firmness mechanism 62. A wireless handheld control device 68 is communicatively coupled to the control unit 66 and facilitates a user sending wireless control signals to the control unit 66 for operating each heating and cooling system 16, elevation mechanism 56 and the firmness mechanism 62.

Thus, a sleeping system 10 has been described that may adjusted for heating and cooling, elevation and firmness. Moreover, in preferred embodiments, sleeping system 10 employs one or more foam layers, e.g., layers 70, 76, 90, stacked so that apertures or openings 78, 80, 92 therein are aligned to form air passages 32. In one or more embodiments, the surfaces of the air passages 32 may be coated with a sealant or similar substance to inhibit loss of air into the foam layers.

Figure 2A:
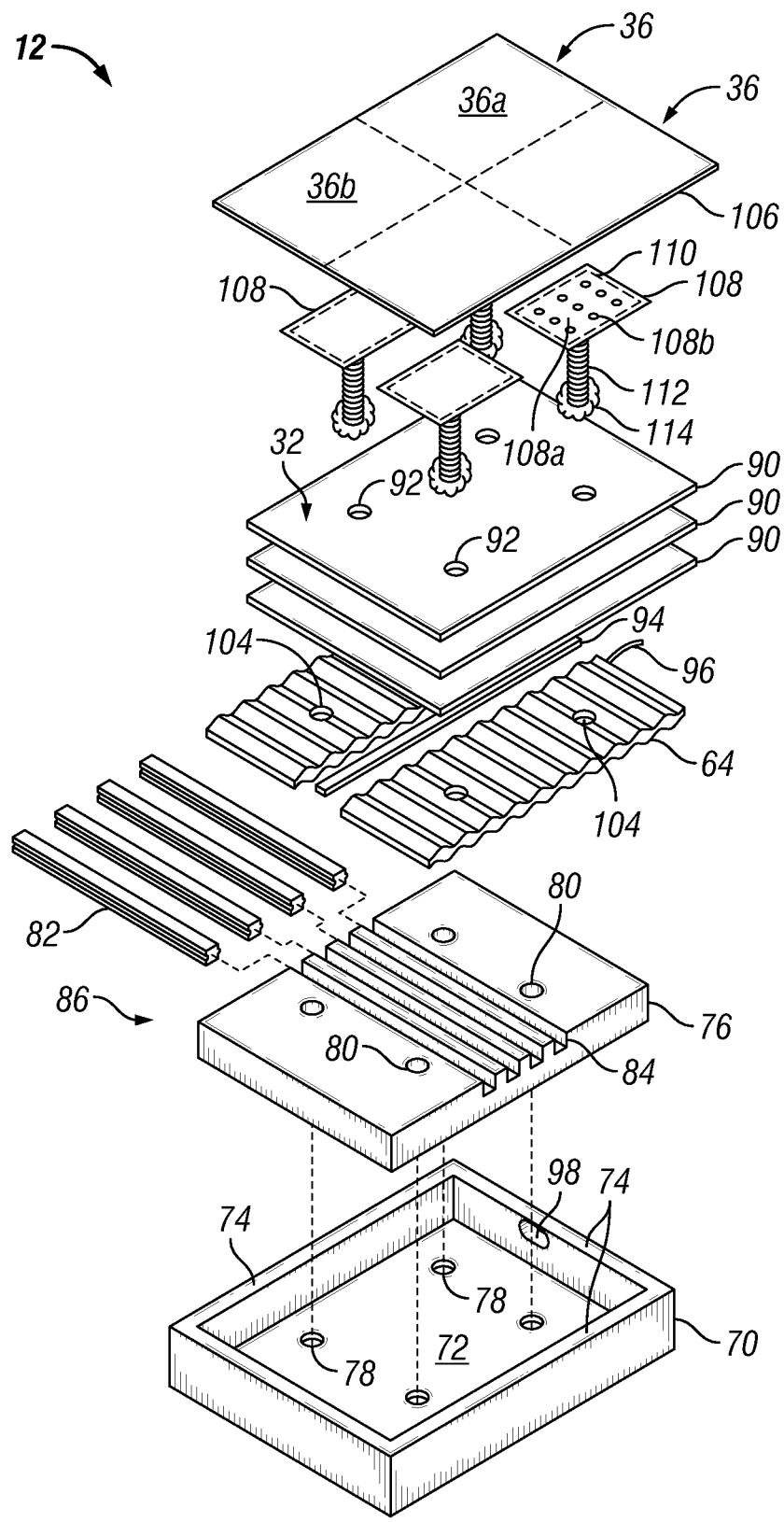
FIG. 2A is an exploded perspective view of the mattress of FIG. 1 illustrating air distribution mechanisms for receiving heated, cooled and at room temperature air from the heating and cooling subsystem of FIG. 1.

Referring to FIG. 2A, the upper mattress assembly 12 generally includes a flexible encasement dish 70 having a base 72 with at least opposing two sidewalls 74 extending from the base 72, thereby forming an "enclosure." In one or more embodiments, sidewalls 74 may be disposed around the perimeter of the base 72. In one or more embodiments, base 72 and/or sidewalls 74 are formed of foam in order to accommodate flexing and bending of encasement dish 70 by operation of elevation mechanism 56. A foam insert 76 may be disposed within the flexible encasement dish 70 between the sidewalls 74. The air passages 32 in the mattress assembly 12 include openings 78 in the base 72 of the flexible encasement dish 70 and openings 80 extending through the foam insert 76. In one or more embodiments, the sidewalls 74 are sized to extend above the top of the foam insert 76 to form a cavity for receipt of one or more fluid bladders 64. In some other exemplary embodiments, the top of the foam insert 76 is approximately flush with the top of the sidewalls 74.

Foam insert 76 may receive one or more cross-bars or engineered springs 82 therein. In or more embodiments, the cross-bars or engineered springs 82 are positioned to alter the flexibility of foam insert 76 at the location of the springs 82. The cross-bars or engineered springs 82 may be disposed in slots 84 formed within the foam insert 76. The slots 84 and springs 82 may be of any shape and size. In some preferred embodiments slots 84 and cross-bars or springs 82 are elongated and extend between sides 74 of the foam insert 76. As will be appreciated, as the elevation of head portion 36a or foot portion 36b is adjusted, insert 76 will tend to bend at a location between the head portion 36a and foot portion 36b. Typically this location is between the air passages 32 associated with the head and foot portions 36a, 36b. Cross-bars or springs 82, and corresponding slots 84, may be positioned at this bending location as desired to adjust support in this area. In other embodiments (not shown), the slots may be circular and the springs may be circular. In other embodiments, the slots may not extend fully across the foam insert 76. In any event, the cross-bars or engineered springs 82 may be compressible by selection of the material from which cross-bars or springs 82 are formed or may alternatively or in addition thereto be shaped to be compressible. The cross-bars or engineered springs 82 may be formed of the same material as the foam insert 76 or different material(s). The engineered springs 82 may be formed of foam or some other compressible or elastomeric material, such as rubber. To the extent the engineered springs 82 are shaped to be compressible, engineered springs 82 may be configured with undulating or waffled surfaces, such as is illustrated in FIG. 2C. The engineered springs 82 may have a density greater than or less than that of the foam insert 76. Together, the foam insert 76 and the engineered springs 82 comprise a first mattress layer 86. The engineered springs 78 may be disposed to make the area of the first mattress layer 86 more rigid or less rigid than a remainder of the first mattress layer 86. In some embodiments (not shown), e.g., where no slots 84 or engineered springs 82 are provided, a foam insert alone may comprise a first mattress layer.

One or more additional layers 90 of foam or other comfort material may be laid over the top of the foam insert 76, as desired, to adjust the comfort level of the mattress assembly 12. These additional layers 90 may each include apertures or openings 92 therein that align with the apertures or openings, e.g., openings 78, 80, in the adjacent mattress layers such as the flexible encasement dish 70 and foam insert 76 so as to form the air passages 32 through the mattress assembly 12. In the illustrated embodiment, the air passages 32 extend from the bottom 12b of the mattress assembly 12 generally to the top 12a of the mattress assembly 12 where conditioned air may be delivered to a user in or on one of the sleeping areas 36.

Figure 3:
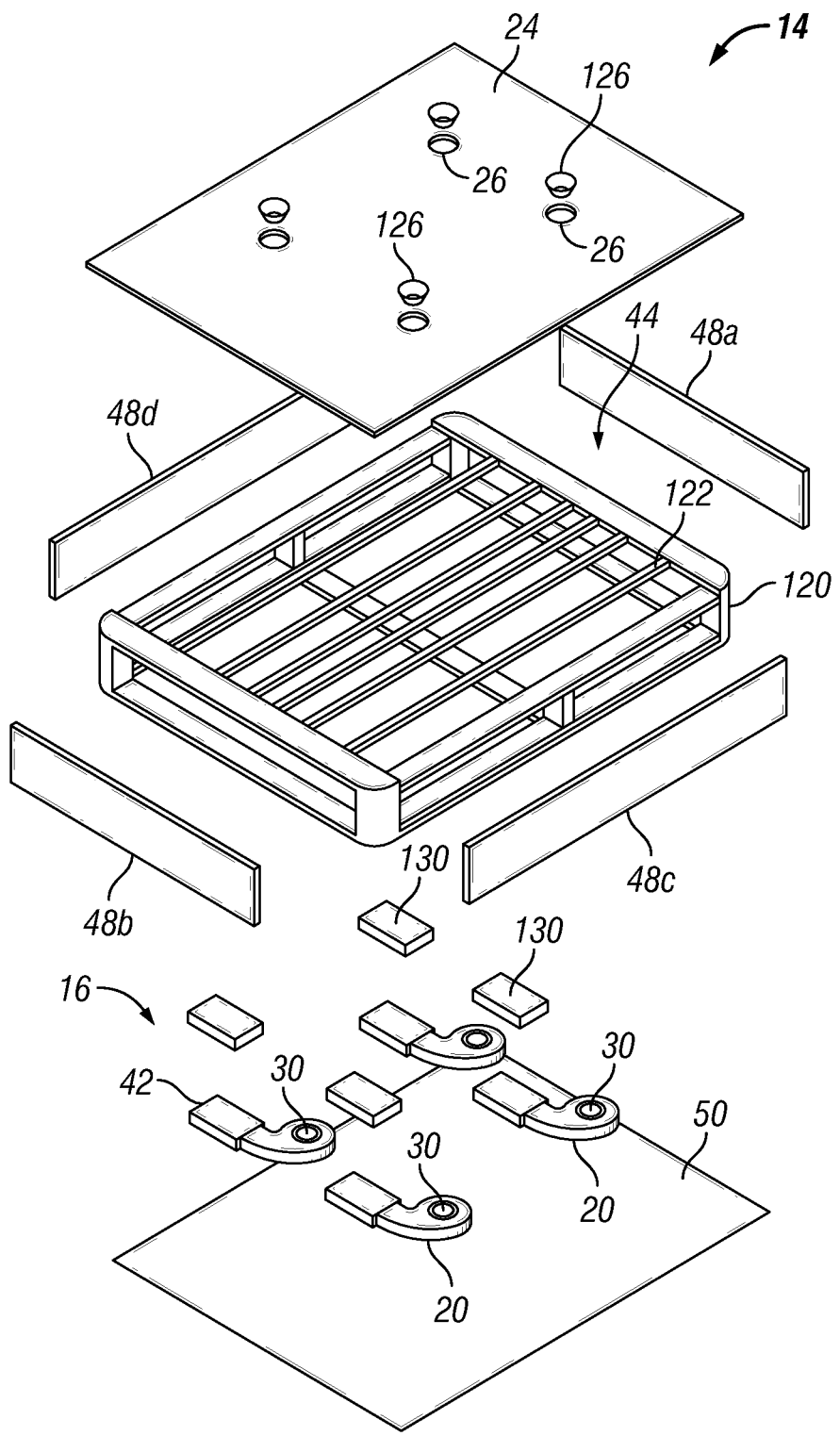
FIG. 3 is an exploded perspective view of the foundation of FIG. 1 illustrating a plurality of blowers each having an exhaust in direct fluid communication with an aperture for coupling to the air distribution mechanisms of FIG. 2A.

In exemplary embodiments, such as those illustrated in FIG. 2A, where a mattress assembly 12 is a configuration that includes a firmness layer, then one or more fluid bladders 64 are disposed on top of the foam insert 76 and below the additional layers 90, if any. In preferred embodiments, fluid bladders 64 are contained within flexible encasement dish 70 to ensure containment of fluid bladders 64 by sidewalls 74. In any event, each sleeping area 36 may include only one fluid bladder 64 for the entire sleeping area 36 as shown, or may include separate fluid bladders 64 for the head portion 36a and foot portion 36b. If a mattress has multiple sleeping areas 36 as shown, then a foam divider 94 may be positioned between the fluid bladders 64 of the sleeping areas 36. Fluid supply hoses 96 or tubing in fluid communication with each fluid bladder 64 may be passed through a channel 98 formed in the sidewalls 74 of the flexible encasement dish 70 (see, e.g., FIG. 5A). In other exemplary embodiments (see, e.g., FIG. 5B), the fluid supply hoses 96 may be passed through the air passages 32 extending through the mattress assembly 12, or another auxiliary opening (not shown) formed through the foam insert 76 and flexible encasement dish 70. The fluid bladders 64 may thus be operatively connected to the firmness mechanism 62 mounted in the foundation assembly 14. In some embodiments, firmness mechanism 62 may include the same blowers/fans/motors 20 (FIG. 3) used in the heating and cooling system 16 such that the fluid bladders 64 may be operatively coupled to the same air motor as is used for heating and cooling, e.g., one or more of the blowers/fans/motors 20 (FIG. 3). In some embodiments the firmness mechanism 62 may include an additional air motor (not specifically shown) therein. It will be appreciated that a valve for containing and releasing air (to adjust firmness of the fluid bladders 64) may be integrated with the blowers/fans/motors 20 (FIG. 3) or firmness mechanism 62, or a valve 102 (FIG. 5B) may otherwise be mounted along the fluid supply hoses 96. The fluid bladders 64 include passages, apertures or openings 104 defined therethrough to allow fluid communication between the opening 78 in the base 72 of the flexible encasement dish 70 and openings 92 in the additional layers 90 or apertures in any additional foam layers that overlay the fluid bladder(s) 64. In this regard, to the extent that fluid bladders 64 are incorporated in an embodiment, one or more foam or other comfort layers or additional layers 90 are disposed over the top of the fluid bladder 64 and include openings 92 align with the openings 78, 80, 104 of the flexible encasement dish 70, the foam insert 76 and bladder 64, thereby forming the air passage 32 for flow of heating or cooling air.

An additional optional top layer 106 constructed of foam, cloth or other comfort material may be provided without openings or apertures, and may be placed over these "cored" layers 70, 76, 64 and 90.

An air distribution mechanism 108 may be disposed over each air flow passage 32 formed in the cored mattress layers 70. The air distribution mechanism 108 may be formed of an air permeable or semi-permeable material, such as cloth. The material need not have any particular shape, but may be square or round and only cover a single air flow passage 32. The material is preferably only secured to the mattress assembly 12 along the perimeter 110 of the material, such as by gluing, sewing or some other attachment mechanism, thereby forcing air to flow through the material between the secured edges along the perimeter 110. In some exemplary embodiments, the air distribution mechanisms 108 may include a generally air impermeable cover 108a with exit openings 108b defined therein to encourage airflow through the exit openings 108b across the entire air distribution mechanism 108 including through the exit openings 108b positioned near the perimeter 110.

In some embodiments, the air distribution mechanism 108 may be coupled to a flexible conduit or tube 112, which, in some embodiments, may include seal 114 at an end of the tube 112 opposite the air distribution mechanism 108. The tube 112 and/or seal 114 may be constructed of material such as vinyl that is impermeable or semi-permeable to air flow. The vinyl tube 112 and seal 114 may serve to prevent leakage of heated or cooled air into the mattress assembly 12 prior to reaching the air distribution mechanism 108. In some exemplary embodiments, the tube 112 is constructed as a flexible or telescoping member, such as a bellows, to accommodate movement of the mattress assembly 12 due to operation of the elevation mechanisms 56, by ordinary use by a user, or any other movement of the mattress assembly 12.

Figure 2B:
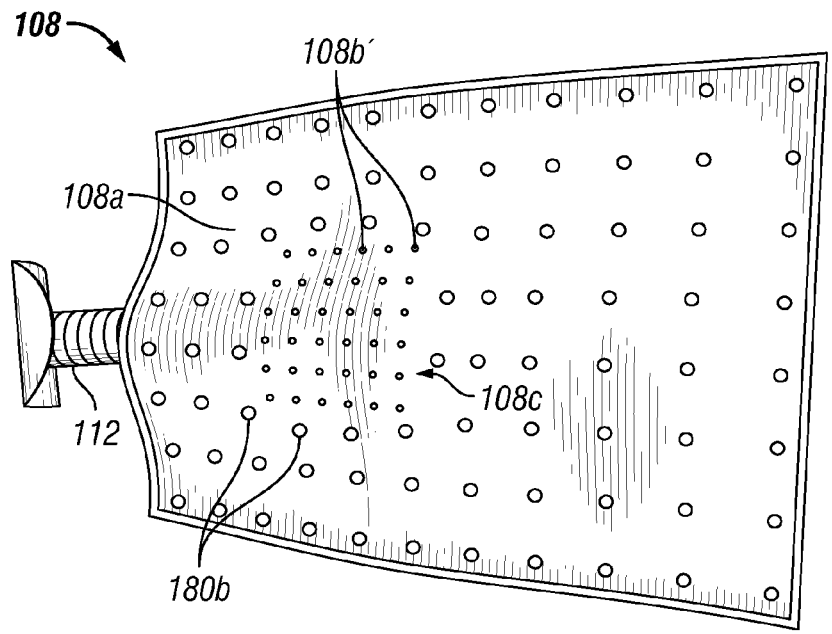
FIG. 2B is an enlarged perspective view of an air distribution mechanism of FIG. 2A.
Figure 2C:
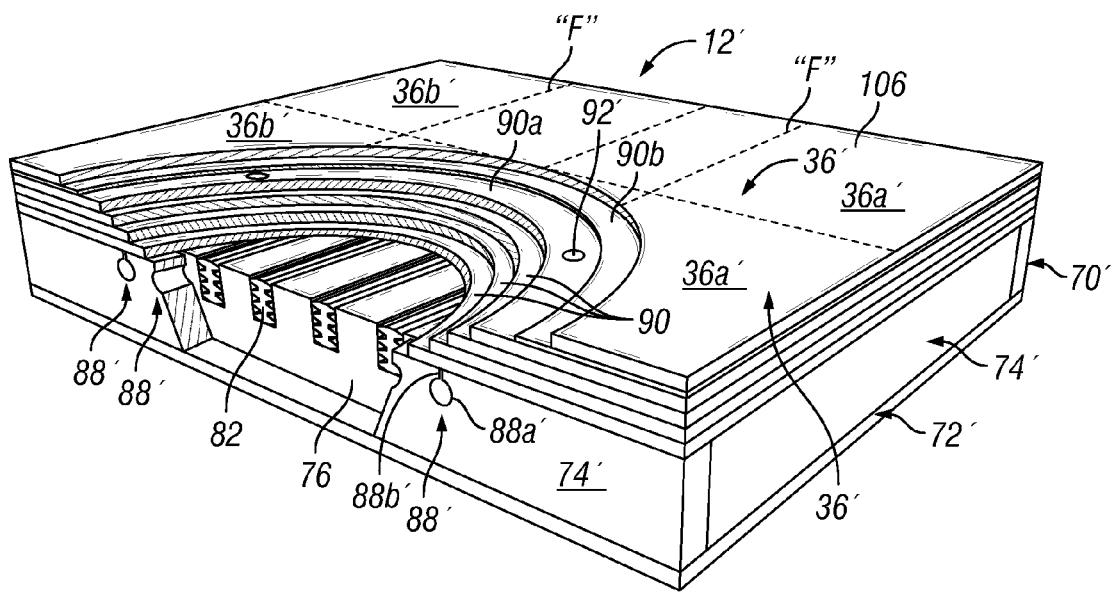
FIG. 2C is a sectional-perspective view of a mattress illustrating an alternate air distribution arrangement in accordance with example embodiments of the present disclosure.

Referring to FIG. 2B, in some exemplary embodiments, the air distribution mechanism 108 includes a flow restrictor 108c in general lateral alignment with the tube 112, or a lateral location where the tube 112 is coupled to the air distribution mechanism 108. The flow restrictor 108c includes a plurality of minor exit openings 108b'defined in the generally air impermeable cover 108a. The minor exit openings 108b' are smaller in diameter than exit openings 180b surrounding the flow restrictor 108c. When the tube 112 is disposed within an air passage 32 (FIG. 2A), the flow restrictor 108c can be in general lateral alignment with the air passage 32, and thus, the flow restrictor 108c is operable to laterally divert a portion of a forced air flow through the air passage 32 to at least some of the exit openings 108b surrounding the flow restrictor 108c, while permitting a portion of the airflow through the minor exit openings 108b' of the flow restrictor 108c. Having exit openings 108b, 108b' of differing sizes facilitates a generally even or uniform lateral distribution of the airflow across the air distribution mechanism 108.

Referring to FIG. 2C, an alternate mattress assembly 12' includes a flexible encasement dish 70' constructed of a generally flat base 72' with sidewalls 74' adhered thereto by glue or an another appropriate adhesive. In some embodiments, the base 72' and sidewalls 74' may be constructed of a high density foam material, which may be more firm than insert 76 provided therein. The flexible encasement dish 70' provides support to the other components of the mattress assembly 12' and promotes durability of sleeping areas 36' of the mattress assembly 12'. The flexible encasement dish 70' may be constructed by arranging the base 72' and the sidewalls 74' around a form (not shown) and applying the adhesive between the sidewalls 74' and the other sidewalls 74', and between the sidewalls 74' and the base 72'. The form may be removed once the adhesive is cured. Keyholes 88' may be formed in flexible encasement dish 70' in sidewalls 74'. The keyholes 88' may include an opening 88a' passing laterally through the sidewall 74' and a slot 88b' extending vertically between the opening 88a' and an upper surface of the sidewall 74'. The keyholes 88' facilitate articulation of the mattress assembly 12', e.g., when one or more portions of the mattress assembly 12 are elevated or lowered with an elevation mechanism 56 (FIG. 1). In the illustrated embodiments the keyholes 88' are positioned between head and foot portions 36a', 36b' of the sleeping area(s) 36 at locations generally along an expected fold (see fold line "F" illustrated in phantom) in the mattress assembly 12' created by elevating a head and/or foot portion 36a', 36b' of the mattress assembly. The insert 76 and engineered springs 82 may be provided within the flexible encasement dish 76' as described above.

In some embodiments, provided above the flexible encasement dish 76' are the three (3) additional layers 90 as described above. The additional layers 90 may be formed from different viscoelastic foam materials arranged from the most firm layer 90 adjacent the flexible encasement dish 76' and the least firm (softest) additional layer 90 on top closer to the sleeping area 36'.

In some embodiments, upper mattress assembly 12 may include a gel layer 90a. The gel layer 90a can be constructed of a viscoelastic foam material infused with a gel. The gel layer 90a provides pressure relief to the sleeping areas 36', while regulating the temperature of the sleeping areas 36'. The gel layer 90a may be configured to undergo a phase change at a desired temperature such that the sleeping area 36' may be maintained at a comfortable temperature for a user. The gel layer 90a may be cored with openings 92' formed therein to permit passage of heated or cooled air from the heating and cooling system 16 (FIG. 1). In some embodiments, the heated and cooled air provided above the gel layer 90a may be insulated, e.g., from the additional layers 90 by the gel layer 90a.

In some embodiments, in fluid communication with openings 92', an air transfer layer 90b may be provided. The air transfer layer 90b may be constructed of an open cell foam or other material through which air may travel laterally from the openings 92' to be distributed over a larger portion of the mattress assembly 12'. Although the air transfer layer 90b is illustrated as extending to the perimeter of the mattress assembly, it should be appreciated that the air transfer layer 90b may extend laterally from each of the individual openings 92' only to an interior location within the respective sleeping area 36', e.g., similar to the air transfer mechanisms 110 described above. A top layer 106 may be provided over the air transfer layer 90b, and affixed to the air transfer layer 90b only at the perimeter as described above.

Referring now to FIG. 3, the open space 44 in the foundation assembly 14 is defined by the top 24, sides 48, and optional bottom 50. The top 24 and sides 48 may be constructed of a rigid or semi-rigid material such as wood or cardboard, and the bottom 50 may be constricted of a flexible cloth or mesh that permits passage of air into the open space 44. The top 24, sides 48 and bottom 50 may be secured to a frame 120, which may include slats 122 or other structural members to support the mattress assembly 12 (FIG. 2A).

The top 24 of the foundation defines apertures 26 therein, which extend between an exterior of the foundation and the open space 44. Air transfer cups 126 may be provided within the apertures 26, and may serve to provide structural support to the apertures 26 or may facilitate sealing between the apertures 26 and the air passages 32.

The heating and cooling system 16 is mounted within the open space 44 and includes the blowers/fans/motors 20. The blowers/fans/motors 20 each include an air intake 42 and exhaust 30. The air intake 42 is positioned within the open space 44 to draw air into the blowers/fans/motors 20 from the open space 44 and the exhaust 30 is mounted in direct communication with their corresponding aperture 26. Direct communication may include the exhaust 30 being mounted within a fitting such as the air transfer cup 126 disposed within a particular aperture 26. The blowers/fans/motors 20 used for heating and cooling, i.e., those in fluid communication with the air passages 32 (FIG. 2A) through the apertures 26, include heating/cooling mechanisms (not shown), such as a thermoelectric device, inserted into the air stream of the motor to heat or cool air passing the heating/cooling mechanism. Other heating/cooling mechanisms may also be utilized.

The blowers/fans/motors 20 may be mounted to the frame 120 of the foundation 20, for example to a slat 22. Alternatively, the blowers/fans/motors 20 may be mounted to the top 24. Insulation members 130 may be provided between the blowers/fans/motors 20 and the respective mounting location to dampen vibrations and reduce noise. The insulation member 130 may be constructed of a flexible or compressible material, such as a foam material.

As described above, a firmness mechanism 62 (FIG. 1) for inflating and deflating the fluid bladders 64 (FIG. 2A) may mounted in the open space 44, as well as the elevation mechanisms 56 and/or control unit 66.

Figure 4A:
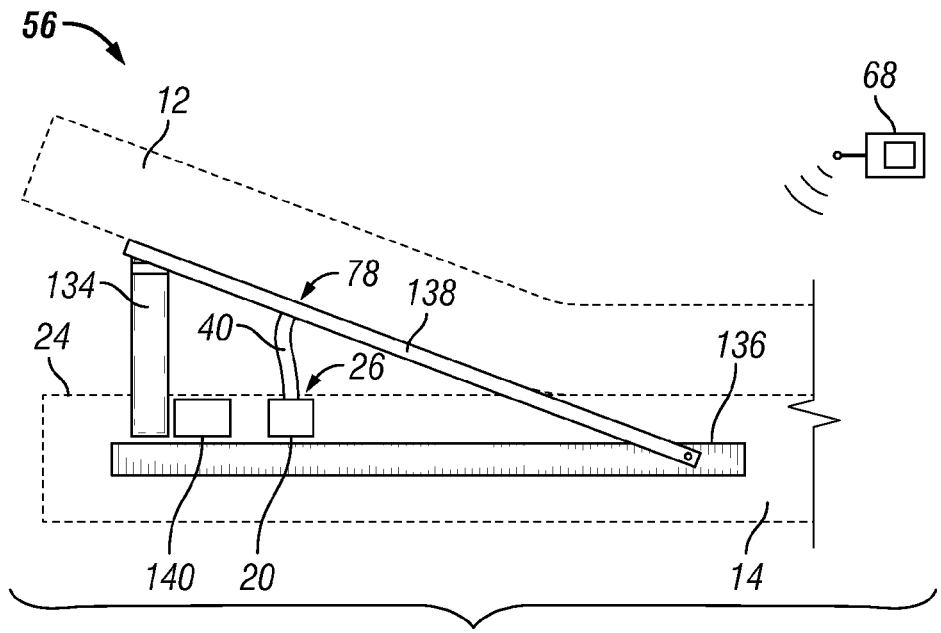
FIGS. 4A and 4B are schematic views of example embodiments of the elevation mechanism of FIG. 1 for raising and lowering portions of the mattress.
Figure 4B:
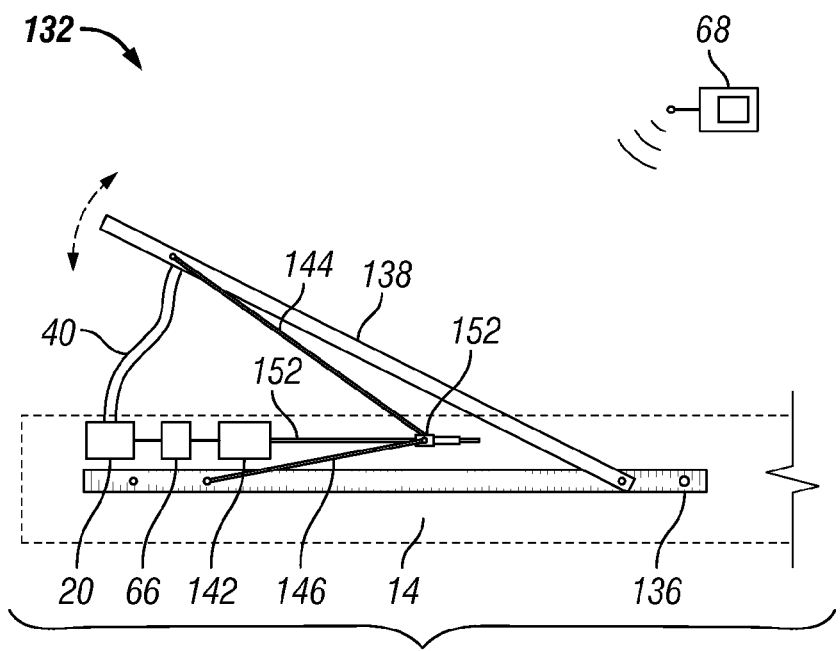

Example embodiments of elevation mechanisms 56, 132 are illustrated in FIGS. 4A and 4B. Elevation mechanism 56 includes an inflatable elevation bladder 134 disposed adjacent the area of the mattress assembly 12 to be elevated, whereby inflation of the elevation bladder 134 alters the elevation of the area. For example, the fluid bladder 134 may be mounted between a fixed bracket 136 secured to the foundation assembly 14 and a movable bracket 138 that supports the mattress assembly 12. Again, in such case, an elevation air motor 140 is disposed in the open space 44 of the foundation assembly 14, and the elevation air motor 140 is operable to inflate and/or deflate the elevation bladder 134. In some embodiments, a flexible conduit 40 is provided between the apertures 26 in the top 24 of the foundation assembly 14 and the openings 78 in the base 72 (FIG. 2A) of the flexible encasement dish 70. The flexible conduit 40 ensures fluid communication between the blowers/fans/motors 20 and air passages 32 in the mattress regardless of the elevation of the portion of the mattress assembly 12. The elevation air motor 140 can be operatively coupled to the control unit 66 (FIG. 1) such that the elevation mechanism 56 may be controlled with the wireless handheld device 68.

Elevation mechanism 132 may include a motor 142 disposed to actuate hinged linkages 144, 146 that alter the elevation of an area of the mattress assembly 12. The hinged linkages 144, 146 may be coupled to a shuttle 150 or a threaded sleeve, which moves along a screw 152 when the screw 152 is turned by the motor 104. Again, the motor 140 can be operatively coupled to the control unit 66 such that the elevation mechanism 66 may be controlled with the wireless handheld device 68. In such case, the motor 140 is disposed in the open space 44 of the foundation assembly 14.

Figure 5A:
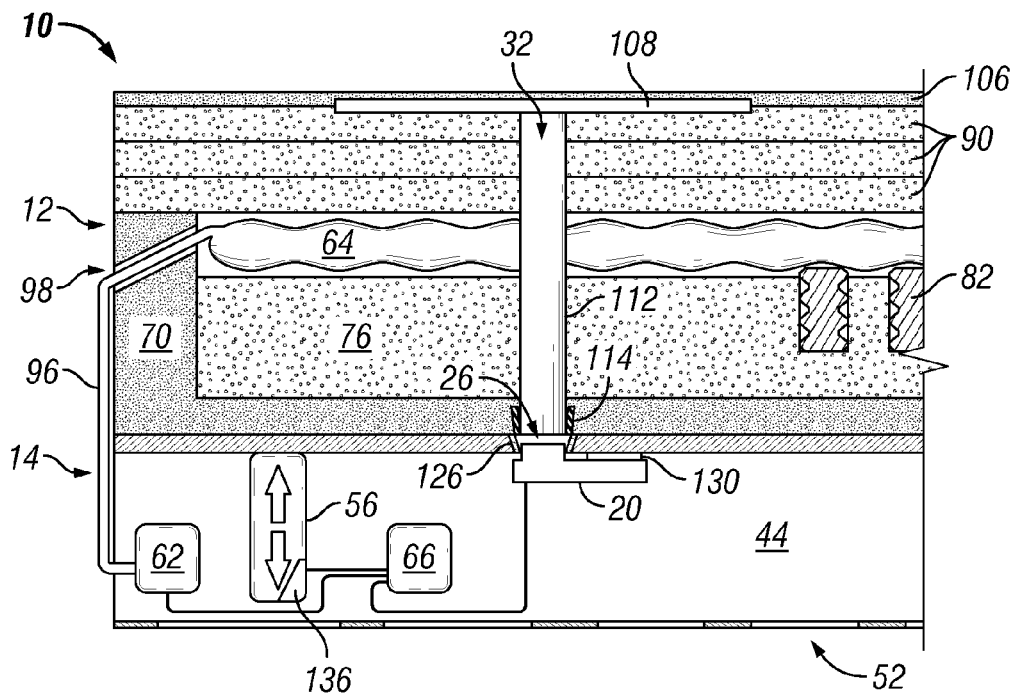
FIG. 5A is a partial, cross sectional schematic view of the sleeping system of FIG. 1 illustrating the mattress and foundation in an assembled configuration.

Referring to FIG. 5A, in some exemplary embodiments, the control unit 66 may be disposed in the open space 44 of the foundation assembly 14, and may be electrically connected to the various motors 20, 140 and mechanisms 16, 56, 62 disposed within the foundation assembly 14. In the illustrated embodiment, the control unit 66 may operate to control the mechanisms 16, 56, 62 to respectively adjust a temperature, elevation and firmness of the mattress assembly 12. The control unit 66 transfers control signals to the mechanisms 16, 56, 62 to which it is electrically connected. Also in the illustrated embodiment, the optional bottom 50 may include air intakes 52 such as ports, slots or holes to facilitate entry of air into the open space 44.

Figure 5B:
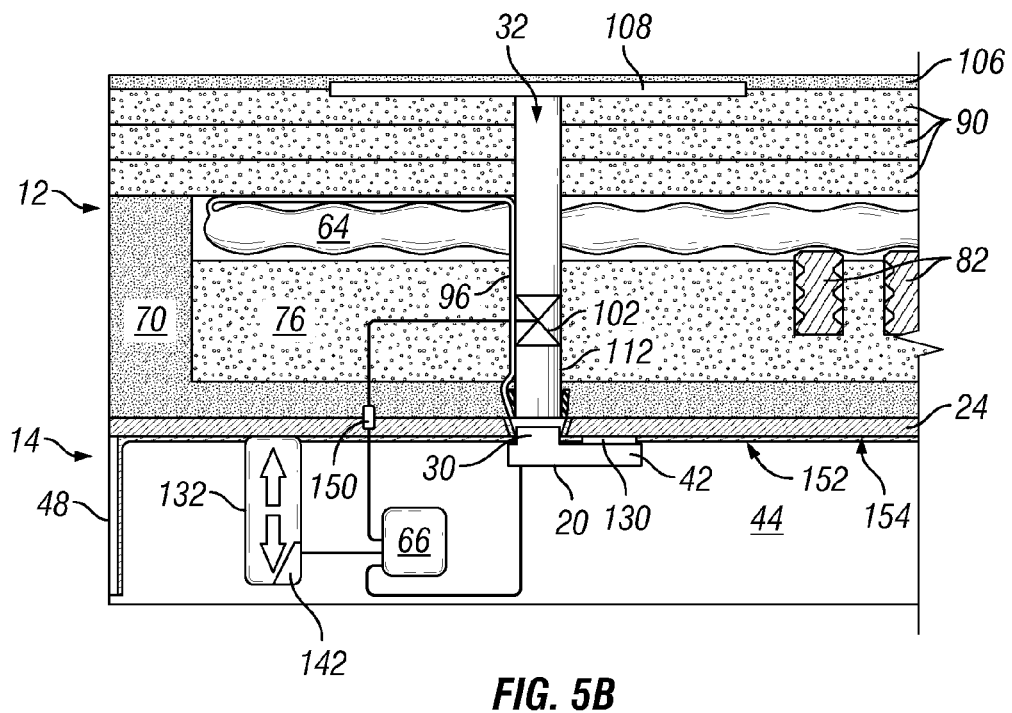
FIG. 5B is a partial, cross sectional schematic view of a sleeping system according to alternate example embodiments of the present disclosure illustrating a shroud disposed within an open space defined within the foundation, and a valve for selectively distributing air flow between the a firmness layer and air distribution mechanism.

Referring to FIG. 5B, the control unit 66 may be operatively coupled to the blowers/fans/motors 20 for selectively heating and cooling the mattress assembly 12 and the elevation mechanism 132 for selectively adjusting an elevation of a portion of the mattress assembly 12 as described above. In embodiment illustrated in FIG. 5B, the firmness mechanism 62 (FIG. 5A) for adjusting a firmness of the mattress assembly 12 may be excluded since the fluid bladder 64 may be inflated and deflated with the same blowers/fans/motors 20 used for heating and cooling. The fluid supply hoses 96 extend through the air passages 32 to the aperture 26 formed in the foundation assembly 14 such that the fluid supply hoses 96 may be in direct communication with the aperture 26. A valve 102 is provided in the air passage 32 and is operable to distribute air flow between the fluid supply hoses 96 and the tube 112. In this manner, a portion or all of the air delivered by the fans/blowers/motors 20 may temporarily be diverted from the air distribution mechanism 108 to the fluid bladder 64 to adjust a firmness of a portion of the mattress assembly 12. The control unit 66 is also in operative communication with the valve 102 to send control signals thereto. In the embodiment illustrated, the valve 102 is carried by the mattress assembly 12, and may be coupled to the control unit 66 in the foundation assembly 14 through a connector 150. As described above, in other embodiments, a valve may be incorporated into the blowers/fans/motors 20 such that the air expelled through the exhaust may be distributed between the fluid supply hoses 96 and the tube 112. Also illustrated in FIG. 5B is an open configuration for the foundation in which the open space 44 is not covered by a bottom 50 (FIG. 5A).

Next, a shroud 152 is provided in the open space 44 adjacent top 24. The shroud 152 serves to enhance airflow to the air intake 42 of the blowers/fans/motors 20 by minimizing air turbulence, and also serves to dampen the noise and vibration from the blowers/fans/motors 20. The shroud 152 thereby minimizes disturbances to a user of the mattress assembly 12. In some exemplary embodiments, the shroud 152 is mounted across at least a portion, and preferably all, of an interior surface 154 of the top 24 of the foundation assembly 14. The shroud 152 is preferably formed of cloth or similar material for dampening, and may be affixed to the top 24 of the foundation assembly 14 by staples, adhesives or other mechanisms. In some exemplary embodiments, the shroud 152 also extends across the sides 48 of the foundation assembly 14, across the slats 122 (FIG. 3) or other components of the frame 120 (FIG. 3) within the open space 44, covering those components to enhance air flow in open space 44. In some exemplary embodiments, the shroud 152 is employed with the insulation members 130, and in some exemplary embodiments, the shroud 152 may replace the insulation members 130.

Methods of Manufacturing the Sleeping System

Figure 6A:
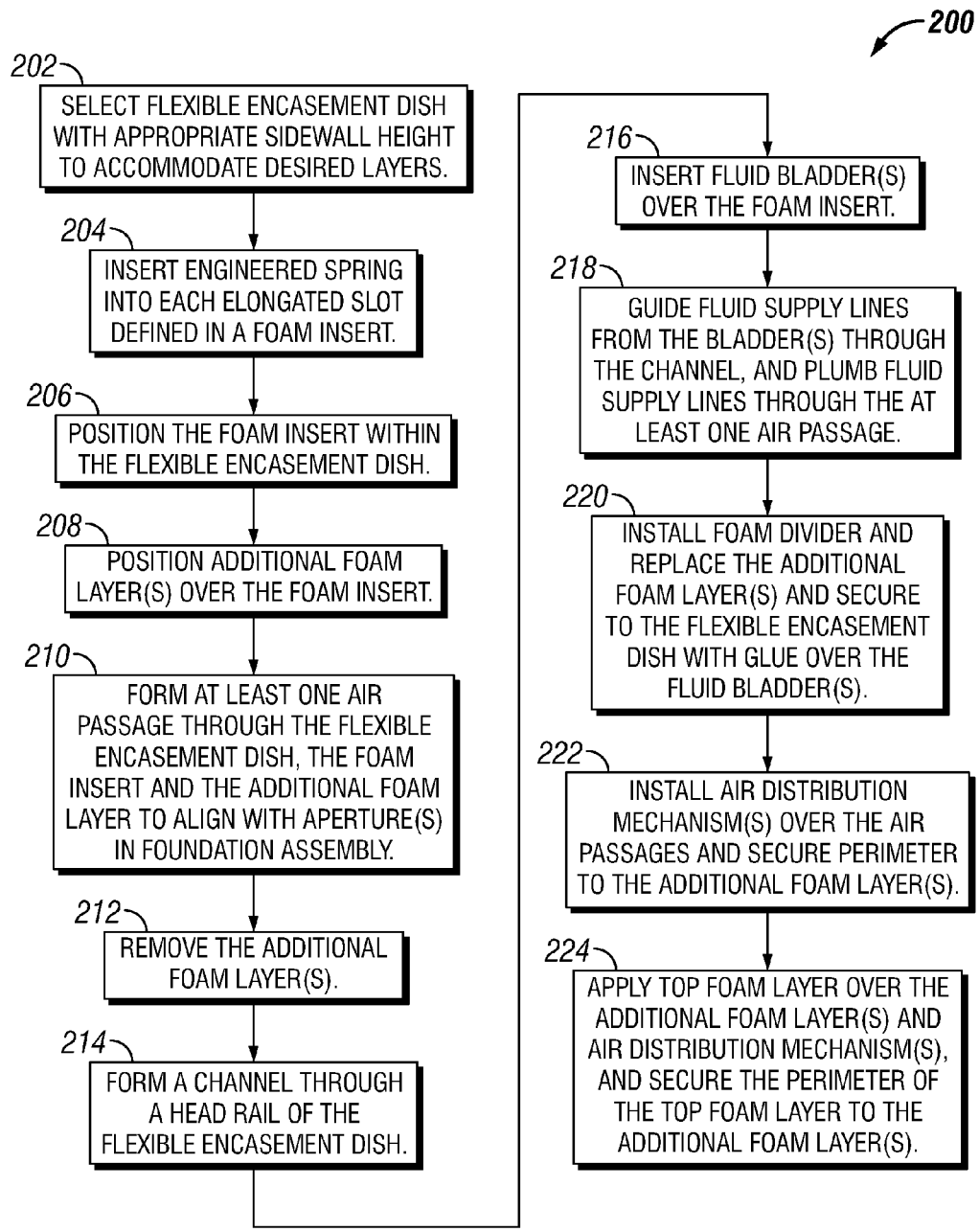
FIGS. 6A through 6C are flowcharts illustrating a method of manufacturing the mattress, foundation and sleep system of FIG. 1, respectively, in accordance with exemplary embodiments of the present disclosure.

Referring to FIG. 6A, and with continued reference to FIGS. 1 through 5B, a method 200 for manufacturing the mattress assembly 12 is described. Initially at step 202, a flexible encasement dish 70 is selected or constructed such that a height of the sidewalls 74 can accommodate one or more desired mattress layers. For example, a flexible encasement dish 70 with 10½ inch sidewalls 74 may be selected where the mattress assembly 12 is planned to include a fluid bladder 64 therein. In other embodiments, where no fluid bladder 64 is planned, a flexible encasement dish 70 with 7½ inch sidewalls 74 may be selected. It will be appreciated that in some embodiments, a portion of the mattress layers are bounded by flexible encasement dish 70, while a portion of the mattress layers are positioned above the sidewalls 74. Likewise, in other embodiments, all layers are contained within encasement dish 70 such that the layers are bounded by sidewalls 74. The flexible encasement dish 70 may be provided as a solid unit, i.e., without the openings 78, channel 98 or keyholes 88' formed therein. Next, at step 204, the elongated cross-bar or engineered springs 82 may be selected and installed within the slots 84 in the foam insert 76. The engineered springs 82 and the foam insert 76 may be positioned within the flexible encasement dish 70 (step 206) between the sidewalls 74. Where a fluid bladder 64 is planned, the sidewalls 74 may extend above foam insert 76, and where no fluid bladder is planned, the sidewalls 74 may be substantially flush with the foam insert 76.

Next at step 208, additional foam layers 90, gel layer 90a and/or air transfer layer 90b may be positioned over the foam insert 76 and/or the sidewalls 74. Where a fluid bladder 64 is planned, the additional foam layers 90, gel layer 90a and/or air transfer layer 90b may be unsecured over the flexible encasement dish 70, and where no fluid bladder 64 is planned, the additional foam layers 90, gel layer 90a and/or air transfer layer 90b may be secured to the foam insert 76, engineered springs 82 and flexible encasement dish 70 with an adhesive. For example, the additional foam layers 90 may be secured around a perimeter thereof with glue to the sidewalls 74, and three evenly spaced lines of glue extending between the head portion 36a and foot portion 36b may secure the additional foam layers 90 to the foam insert 76 and engineered springs 82.

Next at step 210, at least one air passage 32 is cored out of the mattress assembly 12. A drill with an elongated hole saw (not shown) may be used to core out the mattress assembly 12, e.g., by drilling an elongate hole through the assembled additional layers 90, foam insert 76 and flexible encasement dish 70 to form the openings 92, 80 and 78, and thereby to create the at least one air passage 32. The at least one air passage 32 is formed in a position such that the at least one air passage 32 will align with a corresponding aperture 26 when the mattress assembly 12 is positioned on the foundation assembly 14. In embodiments where the air passages 32 are coated with a sealant or similar substance, the air passages 32 may be coated at any time after the air passage 32 is cored out of the mattress assembly 12.

In some exemplary embodiments, e.g., where inclusion of a fluid bladder 64 is planned, the method 200 proceeds to step 212 where the additional foam layers 90 are removed from their unsecured location on top of the foam insert 76 and the flexible encasement dish 70. Once removed, access to an interior space of the flexible encasement dish 70 above the foam insert 76 facilitates forming a channel 98 through a sidewall 74 of the flexible encasement dish 70 in step 214. For example, the channel 98 may be drilled at an 80 degree angle from horizontal through a sidewall 74 adjacent the head portion 36a of a sleeping area 36. A drilling template (not shown) may be employed to ensure the correct location and angle of the channel 98. In some embodiments, keyholes 88' may also be drilled and/or cut through sidewalls 74 at step 214.

Any debris generated from drilling in steps 210 and 214 may be blown out of the air passage 32, channel 98 and/or keyholes 88', and the fluid bladder(s) 64 may be inserted into the flexible encasement dish 70 over the foam insert 76 (step 216). In some exemplary embodiments, a separate fluid bladder 64 is inserted to correspond to each sleeping area 36, and in some exemplary embodiments, a separate fluid bladder 64 is inserted to correspond with each head portion 36a and each foot portion 36b of the sleeping areas 36. In any event, the fluid bladders 64 may be inserted such that the openings 104 extending through the fluid bladders 64 align with the openings 80 and 78 in the foam insert 76 and flexible encasement dish 70. Next, in step 218, the fluid supply hoses 96 may be guided through the channel 98 and/or plumbed through at least one of the air passages 32. The fluid supply hoses 96 may be inspected to ensure no pinch points are identified. Next, at step 220, the foam divider 94 may be positioned between the fluid bladders 64 (in embodiments including more than one fluid bladder 64) and the additional foam layers 90 may be replaced over the fluid bladder(s) 64. The additional layers 90 may be secured to the flexible encasement dish 70 with glue or another adhesive provided between the additional layers 90 and the flexible encasement dish 70 around the perimeter edge. Prior to applying the adhesive, it should be verified that all of the edges are even, aligned and straight.

Next, the method 200 proceeds to step 222. In some exemplary embodiments, e.g., where no inclusion of a fluid bladder 64 is planned, the method 200 may proceed directly from step 210 to 222. At step 222, an air distribution mechanism 108 is installed over each of the air passages 32. In some exemplary embodiments, the air distribution mechanism 108 may be installed by inserting the tubes 112 and seals 114 into the air passages 32 until the air distribution mechanisms 108 engage the uppermost additional layer 90, and the bottom of the tubes 112 are flat across the bottom of the base 72. The perimeter 110 of the air distribution mechanisms 108 may be secured to the uppermost additional layer 90 by gluing, sewing or other in another manner.

At step 224, a top layer 106 is applied over the air distribution mechanisms 108. In some exemplary embodiments, the top layer 106 is affixed to the uppermost foam layer 90 only around the perimeter of the top layer 106 radially outward from the air distribution mechanisms 108. When the mattress assembly 12 is completed, the air passages 32 should align with the apertures 26 in the top of the foundation assembly 14.

Figures 6B, 6C:
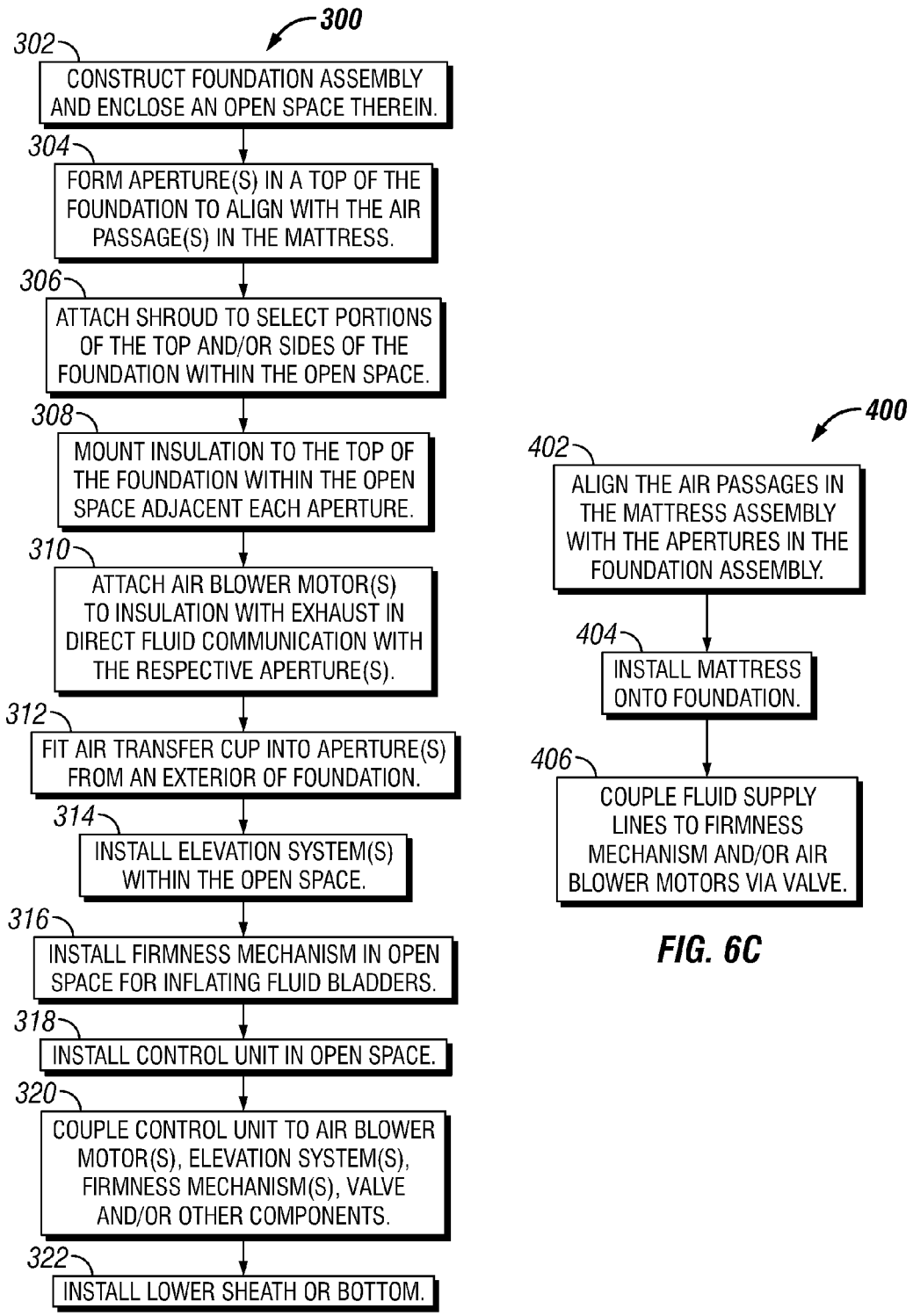

Referring to FIG. 6B, and with continued reference to FIGS. 1 through 5B, a method 300 for manufacturing the foundation assembly 14 is described. Initially at step 302, the frame 120 of the foundation assembly 14 is constructed and the open space 44 is enclosed therein. For example, the open space 44 may be enclosed by affixing the top 24 and sides 48 to the frame 120. Next, at step 304, the apertures 26 may be formed in the top 24 of the foundation assembly 14 by drilling one or more holes though the top 24 in appropriate positions to align with the air passages 32 of the mattress assembly 12 when the mattress assembly 12 is positioned on the foundation assembly 14. Next, the shroud 152 may be attached to select portions of the top 24 and or sides 48 of the foundation assembly 14 within the open space 44. The shroud 152 may be affixed to interior portions of the top 24 of the foundation assembly 14 such that the apertures 26 are not obstructed by the shroud 152. In some embodiments, the shroud 152 may be affixed to the top 24 prior to affixing the top 24 to the frame 120.

Next, at step 308, insulation members 130 are mounted to the frame 120, the top 24, shroud 152 or at another location within the open space 44. The insulation members 130 are mounted adjacent each of the apertures 26 such that the blowers/fans/motors 20 may be mounted (step 310) onto the insulation members 130 with an exhaust 30 in direct communication with the respective aperture 26. The air transfer cups 126 may then be mounted within the apertures 26 from the exterior of the foundation assembly 14 in step 312. Alternatively, the air transfer cups 126 may be fitted into the apertures 26 prior to mounting the blowers/fans/motors 20.

Next, additional and optional equipment may be mounted in the open space 44 depending on the configuration and functionalities planned for the sleeping system 10. For example, an elevation mechanism 56, 132 and/or firmness mechanism 62 may be mounted within the open space 44 (steps 314, 316, respectively). Next, the control unit 66 can be mounted within the open space 44 (step 318) and the control unit can be coupled to each of the blowers/fans/motors 20, the elevation mechanism(s) 56, 132 additional motors 62, valve 102 and any additional components, e.g., a massage mechanism (not shown). Next, at step 322, a sheath or bottom 50 may be installed, if desired.

Referring to FIG. 6C, once the mattress assembly 12 and the foundation assembly 14 are complete, a method 400 for assembling the sleeping system 10 may be performed. First at step 402, the air passages 32 in the mattress assembly 12 are aligned with the apertures 26 in the foundation assembly 14. Next, at step 404, the mattress assembly 12 is installed onto the foundation assembly 14 with the air passages 32 aligned and in fluid communication with the apertures 26 in the foundation assembly 14. Next, at step 406, any mattress component requiring coupling to a foundation component may be coupled. For example, the fluid bladder 64 in the mattress assembly 12 may be coupled to the firmness mechanism 62 in the foundation 32 by coupling the fluid supply lines or hoses 96 to the firmness mechanism 62. Alternatively or additionally, the valve 120 may be coupled to the control unit 66 with the connector 150 or other appropriate control line. Once all the mattress components are coupled to the appropriate foundation components, a user may control the sleeping system 10 with the wireless handheld control device 68.

Figure 7:
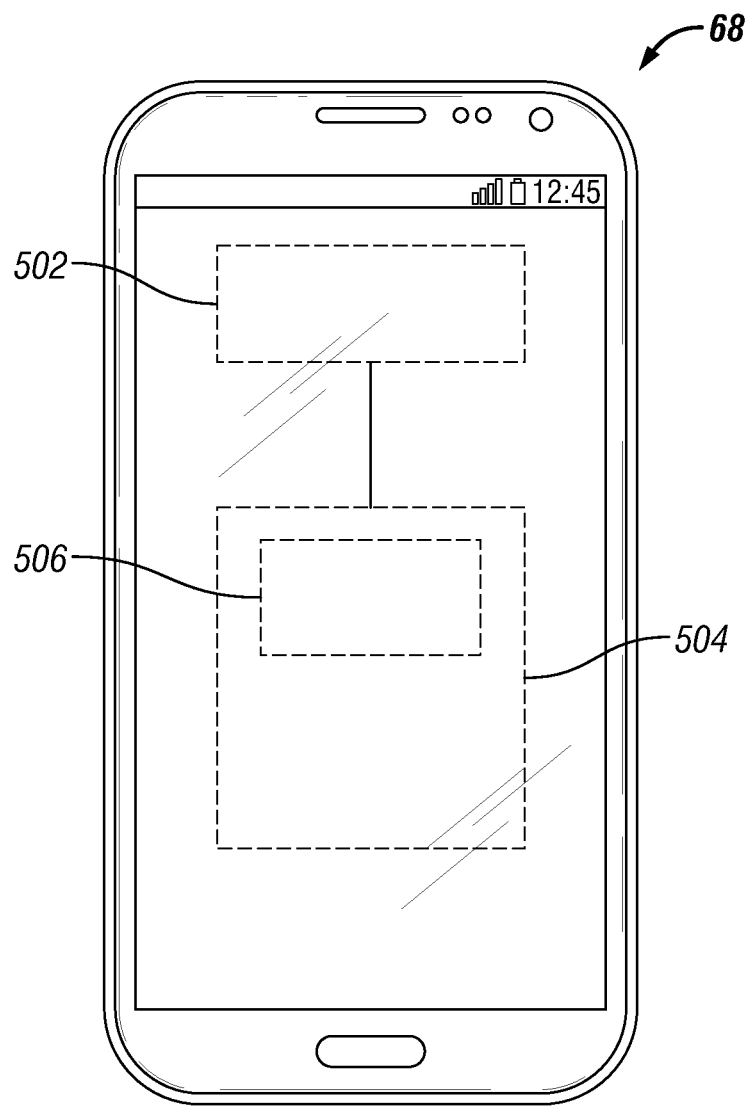
FIG. 7 is a schematic view of the wireless control device of FIG. 1.

Mattress Handheld Wireless Controller with Control Application Software Loaded Thereon Referring to FIG. 7, the wireless handheld control device 68 is provided to wirelessly communicate with the control unit 66 (FIG. 1). The wireless control device 68 includes a processor 502, non-transitory computer readable medium 504 operatively coupled to the processor 502; and a computer program or software 506 stored on the computer readable medium 504 and executable by the processor 502 to cause the handheld control device 68 to send wireless control signals to the motors 20, 136, 142, mechanisms 16, 56, 62, 132 and/or control unit 66 mounted in the foundation assembly 14. In some exemplary embodiments, the software 506 is an application that facilitates control of the temperature of the mattress assembly 12, the elevation of the mattress assembly 12 and the firmness of the mattress assembly 12 (or portions thereof).

In one or more embodiments, the wireless handheld control device 68 can include a wireless handheld controller with various types of user interface control elements. For example the wireless control device 68 may include buttons (not shown) for operation, or the wireless handheld control device 68 can include a wireless device with a touch screen, such as a mobile phone, or preferably a personal digital assistant. The software 506 or computer program may be an application or "app" with one or more of the various example control and functionality screens illustrated in FIGS. 8A through 8J.

Figures 8A, 8B:
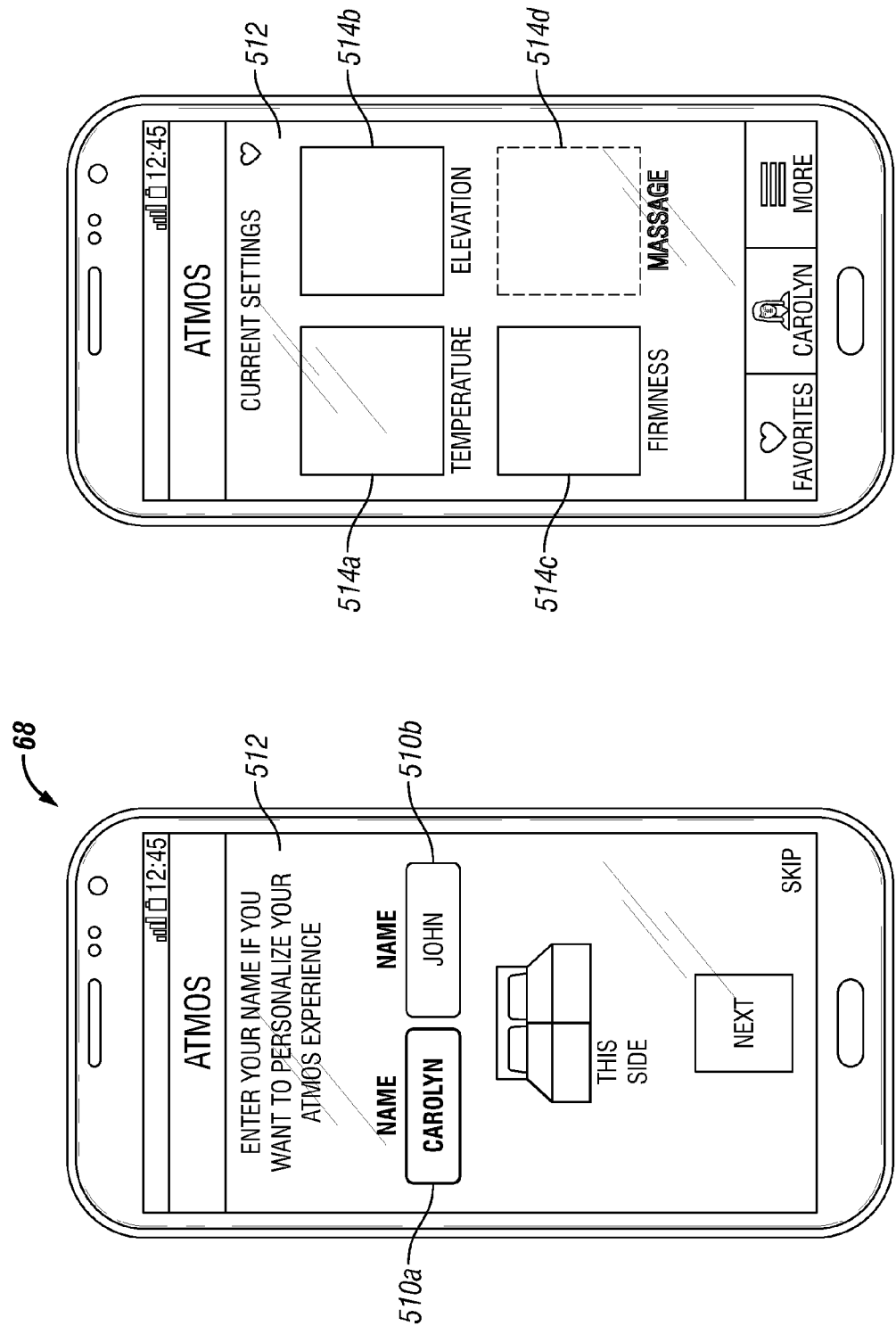
FIGS. 8A-8J are example screenshots of the wireless control device of FIG. 1 illustrating aspects of controlling heating, cooling, elevation, firmness, and optional massage capabilities of the subsystem and the therefrom.

Referring to FIGS. 8A through 8J, the software 506 facilitates input by an operator of a mattress size. Based on the size, the operator may have option to select control of one sleeping area 36 (e.g., for twin mattress) or control of any one of multiple sleeping areas 36 (e.g., for queen and king mattress) as illustrated in FIG. 8A. The operator may designate the sleeping area 36 selected by touching a particular control element 510a, 510b of a touchscreen 512. In some embodiments, a user may personalize the sleeping system 10 by defining a sleeping area 36 for each individual, or a user may control all sleeping areas 36 collectively (with same firmness, temperature and elevation). If a sleeping area 36 has separately controllable equipment for the head and foot portions 36a, 36b of the sleeping area 36, the operator may have individual control of these portions 36a, 36b as well.

For each sleeping area 36, an operator may have the option to select an available function. As illustrated in FIG. 8B, control elements 514a, 514b and 514c facilitate a selection among temperature, elevation and firmness. Unavailable functions may be indicated by a control element that is "greyed out" on the touchscreen 512. For example, the massage function may be unavailable and control element 514d (illustrated in phantom) may indicate to a user that the massage function is unavailable on the particular sleeping system 10.

For each function, a control screen includes a control element for making a particular adjustment. For example, where the temperature function is selected, the software 506 may provide a control screen (FIG. 8C) with a control element 516 in the form of a slide-bar. The control element 516 may be manipulated to permit the temperature of the selected sleeping area 36 to be increased or decreased between cool and warm. Alternatively or in addition thereto, control elements 518a, 518b may be provided with a plus (+) or minus (−) to increase or decrease the temperature, respectively. The slide-bar control element 516 or other area on the touchscreen 512 may include an indication or extent of the particular function, with the indication altering as the control element is manipulated. For example, the temperature can have a numeric value that changes to indicate the relative temperature as the control element 516 is moved up or down. Similarly, when the elevation function is selected, a numeric indication of the angle of incline of the controlled area may be provided (see FIG. 8G) and where the firmness function is selected, a numeric value along with a linguistic indicator, e.g., soft, medium, or hard (see FIG. 8H), or a symbolic indicator may be provided.

Figure 8D:
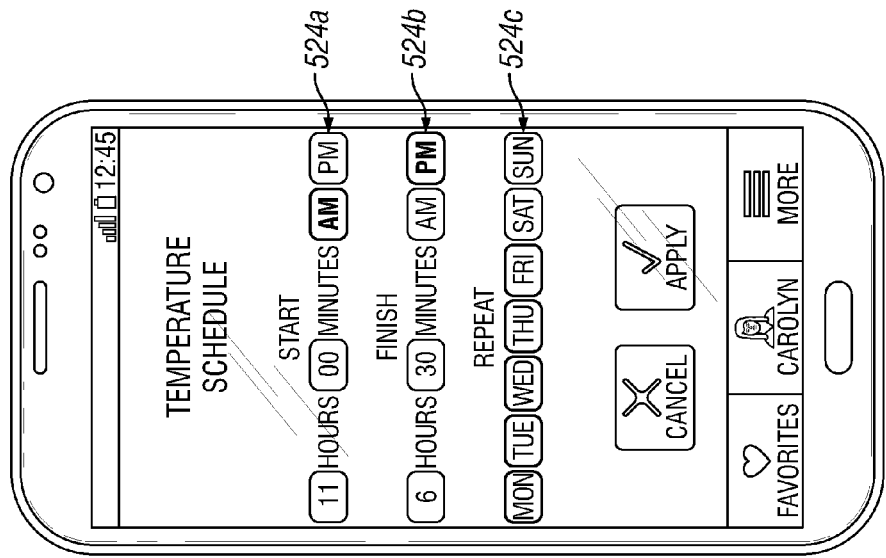
Figure 8C:
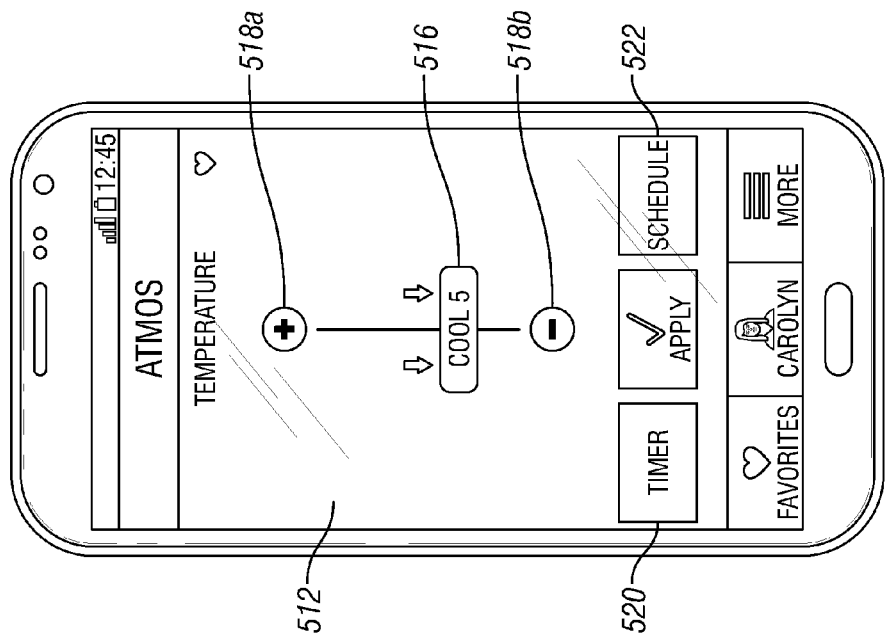

Optionally, each control screen may include a timer control element 520 and/or a schedule control element 522 so that a user can set an operation to occur for a certain period of time, and/or define when a certain operation is to occur. For example, if the user selects the schedule control element 522, the software 506 can provide a control screen as illustrated in FIG. 8D. Calendar control elements 524a, 524b and 524c permit a user pre-program to a particular function to be performed at particular date(s) and time(s).

Figure 8F:
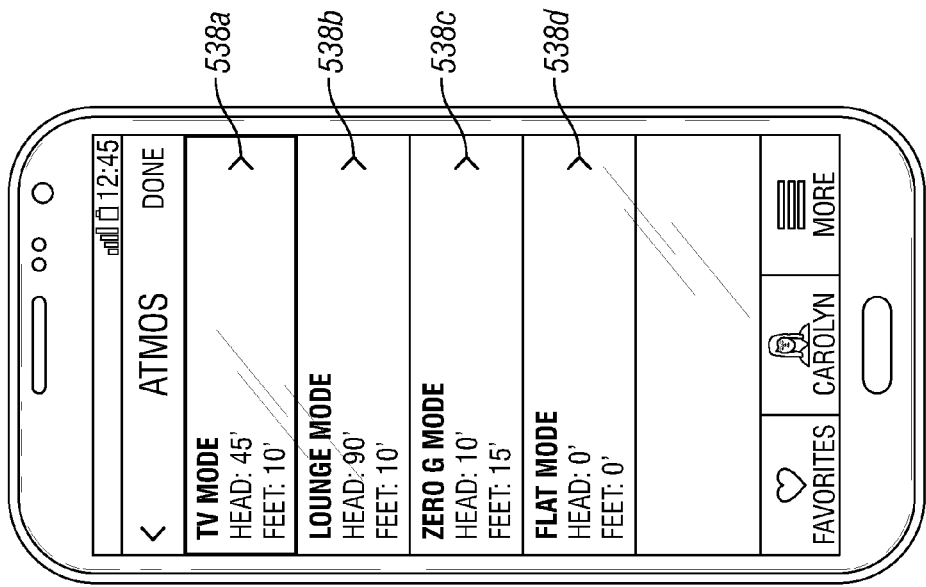
Figure 8E:
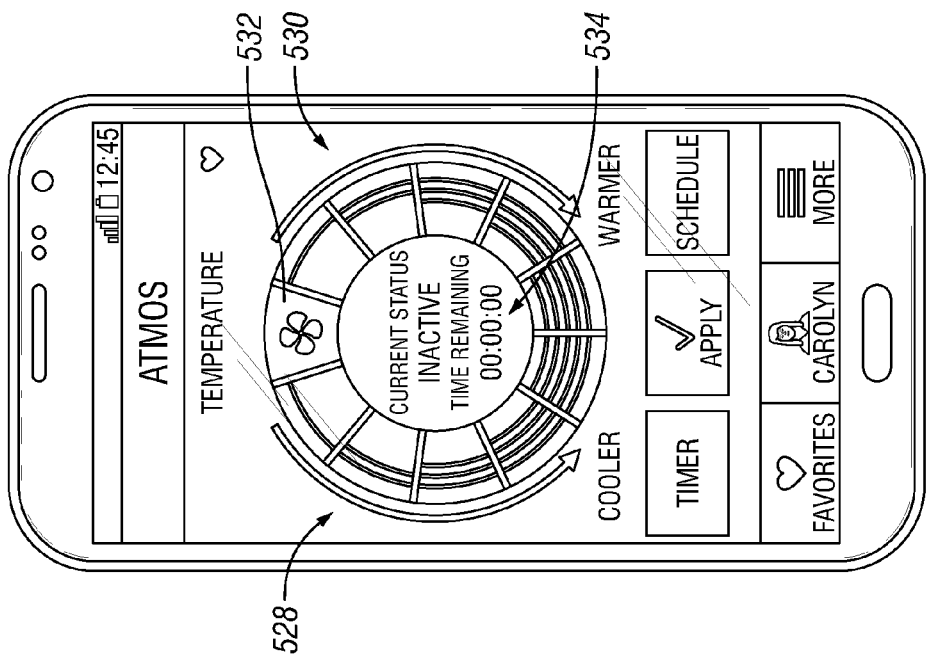

An alternate temperature control screen is illustrated in FIG. 8E. Control elements 528 permit a user to adjust a cooling function and control elements 530 permit a user to adjust a heating function. A control element 532 may permit the user to select an "off" condition for a particular controlled element. For example, selecting the control element 532 permits a user to cause the fans/blowers/motors 20 to turn off, and stop circulating air through the mattress assembly 12. A status identifier 534 can provide the user of the current state of operation of the fans/blowers/motors 20.

As illustrated in FIG. 8F, the software 506 may provide an optional control screen to facilitate setting different modes for different activities. For example, the elevation configuration of a mattress assembly 12 may be defined by selecting one of the control elements 538a, 538b, 538c or 538d. For example, a user may select control element 538a to specify a preferred elevation condition of a head portion 36a and a foot portion 36b of sleeping area 36 for watching television. For sleeping, the user may prefer to select a flat configuration for the sleeping area 36, which may be specified by selecting control element 538d.

Figure 8H:
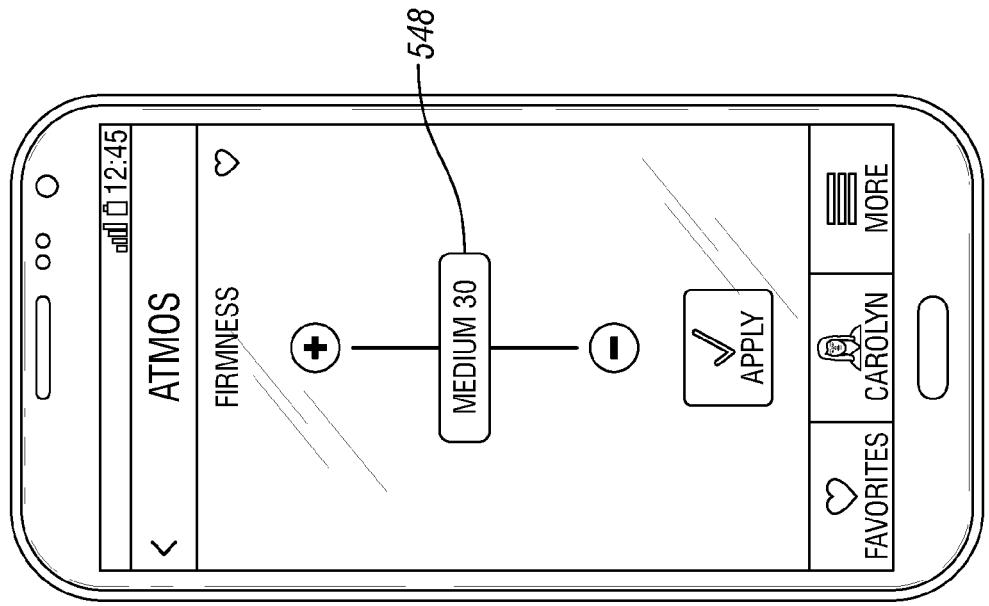
Figure 8G:
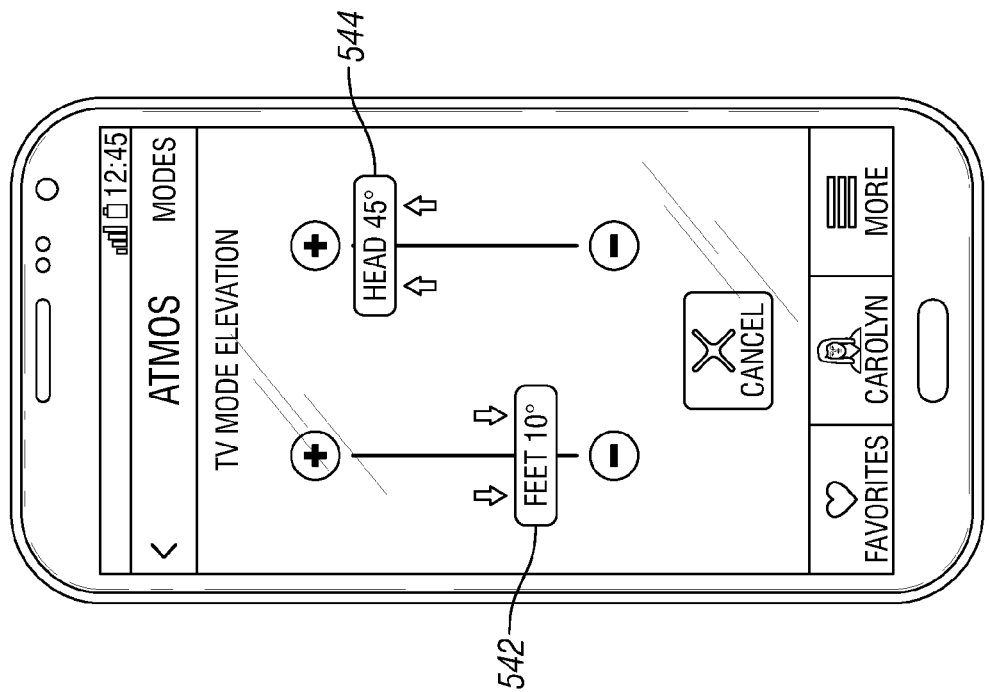
Figure 8J:
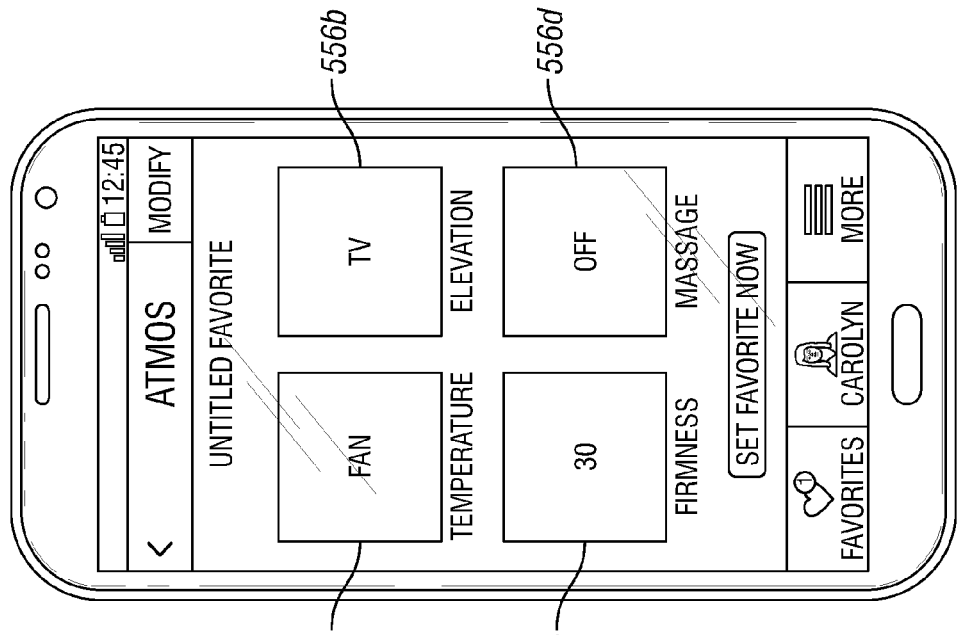

When a user selects control element 538a to specify a preferred condition for watching television, the software 506 may provide a control screen as illustrated in FIG. 8G. Control elements 542 and 544 facilitate the user specifying the preferred configuration for the elevation of the sleeping area 36 for the TV mode, but do not necessarily immediately activate the elevation mechanism(s) 56, 132. The preferred configuration can be saved on the non-transitory computer readable medium 504, and the elevation mechanism(s) can be automatically activated adjust the sleeping system by selecting the "TV mode." The particular mode may be selected from various control screens (see, e.g., FIG. 8J).

Figure 8I:
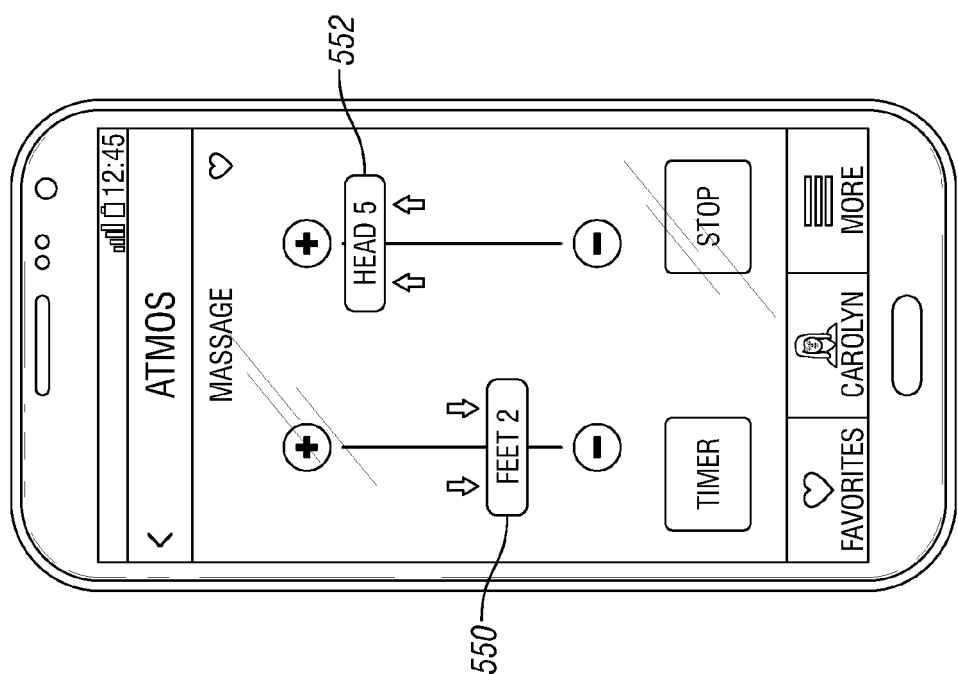

In some exemplary embodiments, the software 506 may provide control screens for manual control of various functions. For example, the control screen illustrated in FIG. 8H provides control element 548 for adjusting the firmness of a sleeping area 38 by adjusting an inflation level of the fluid bladder 64. The firmness may be adjusted from soft to firm. Additionally, a control screen illustrated in FIG. 8I provides control elements 550, 552 for adjustment of a massage condition (in sleeping systems where a massage function is available).

In one or more embodiments, the software 506 may also provide control screens that facilitate a user setting specific target configurations, and the sleep system 10 may be instructed to automatically control the various functions to adjust to the target configurations. The target configurations may be set, e.g., by setting "Favorites" by accessing the control screen illustrated in FIG. 8J. A favorite condition can be defined by individually manipulating control elements 556a, 556b, 556c and 556d to access control screens that facilitate input of the preferred states of the fans/blowers/motors 20, the elevation mechanism(s) 56, 132, fluid bladder(s) 64 or other controllable elements. A favorite condition may be selected to cause the sleep system 10 to automatically adjust each controllable element to their respective preferred states.

The various control screens described herein may provide multiple control elements to individually control individual controllable elements in some embodiments. For example a function such as elevation may be adjusted by two control elements on a control screen to facilitate individual control of each individual elevation mechanism 56, 132. Likewise, a function such as temperature may be adjusted by individual control elements provided for individual control of multiple cooling/heating fans/blowers/motors 20 for a particular sleeping area 36 by manipulating multiple individual control elements on a control screen. Each control element may be dedicated to the control of a separate fan/blower/motor 20.

Aspects of the Disclosure

According to one aspect of the disclosure, a sleeping system includes a mattress assembly and a foundation assembly. The mattress assembly has a top and a bottom and includes a foam enclosure or flexible encasement dish having a base and opposing sidewalls extending from the base. At least one aperture or opening is defined within the base. A first mattress layer is disposed within the flexible encasement dish, and the first mattress layer includes a foam insert. The foundation assembly includes a top, a bottom and sides extending between the top and the bottom, with an open space formed between the top, bottom and sides. The top and sides are enclosed, and the top has at least one aperture defined therein. An air blower is positioned in the open space adjacent the top, and the air blower has an exhaust in direct fluid communication with the aperture. An air intake of the air blower is open to the open space.

In one or more exemplary embodiments, the foam insert has opposing sides and at least one slot formed in the foam insert and extending between the opposing sides of the foam insert. An elongated cross-bar may be inserted into each slot.

In some exemplary embodiments, the sleeping system further includes at least two additional mattress layers disposed over the first mattress layer. In some embodiments, the foam insert includes at least one opening extending therethrough and in fluid communication with the aperture of the foundation assembly. In one or more exemplary embodiments, the air blower includes a heating and cooling mechanism for heating or cooling air expelled through the exhaust, aperture and opening(s).

In one or more example embodiments, the foundation assembly includes at least two apertures defined in the top of the foundation assembly and at least two air blowers. Each air blower is in communication with an aperture. The mattress assembly includes at least two openings extending through the first mattress layer, and at least two openings formed in the base of the flexible encasement dish. Each first mattress layer opening is in fluid communication with a respective opening in the base of the flexible encasement dish so as to form air passages through the mattress assembly. Each air passage is in fluid communication with a corresponding aperture of the foundation assembly.

In some embodiments, the sleeping system further includes a firmness layer disposed within the flexible encasement dish between the sidewalls and above first mattress layer. The firmness layer may include an inflatable fluid bladder.

In one or more embodiments, the sleeping system further includes at least one keyhole formed in a side of the flexible encasement dish. The keyhole may include an opening passing laterally through the sidewall and a slot extending vertically between the opening and an upper surface of the sidewall. In some embodiments, the sleeping system further includes an air distribution mechanism adjacent the top of the mattress assembly overlaying one or more openings in the foam insert.

According to another aspect, the disclosure is directed to a sleeping system including a mattress assembly and a foundation assembly. The mattress assembly has a top and a bottom and defines a sleeping area thereon. The mattress assembly includes a flexible encasement dish having a base and sidewalls extending substantially around the perimeter of the base and at least one opening defined within the base. A first mattress layer is disposed within the flexible encasement dish between the sidewalls, and the first mattress layer includes a foam insert having opposing sides and a plurality of slots formed in the foam insert. The slots extend between the sides of the foam insert, and the first mattress layer further includes at least one opening extending therethrough and axially aligned with the opening of the flexible encasement dish, thereby forming an air passage through the mattress assembly. The air passage is in fluid communication with the sleeping area. An elongated cross-bar is disposed in each slot. At least one additional mattress layer is disposed over the first mattress layer. A firmness layer is disposed within the flexible encasement dish between the sidewalls and between the first mattress layer and the additional mattress layer. The firmness layer includes an inflatable fluid bladder. The foundation assembly has at least one sleeping area defined thereon. The foundation assembly includes a top, a bottom and sides extending between the top and the bottom, with an open space formed between the top, bottom and sides, wherein the top and sides are enclosed. The top has at least one aperture defined in each sleeping area. For each aperture, an air blower is in proximity thereto and is positioned in the open space adjacent the top. Each air blower has an air heating and cooling mechanism for conditioning air, and each air blower has an exhaust in direct fluid communication with the aperture and an air intake open to the open space. The mattress assembly is disposed on the foundation assembly so that the aperture in the foundation assembly aligns with the air passage formed through the mattress assembly.

In one or more embodiments, the sleeping system further includes an air permeable sheath disposed over at least a portion of the bottom of the foundation assembly. In some embodiments, the sleeping system further includes an air distribution mechanism adjacent the top of the mattress assembly and overlaying one or more fluid passages through the mattress assembly. In some embodiments, the sleeping system further includes a gel layer disposed between the top of the mattress assembly and the firmness layer.

In one or more exemplary embodiments, the sleeping system further includes a gel layer disposed between the top of the mattress assembly and the firmness layer. In some embodiments, the sleeping system further includes at least one elevation mechanism disposed within the open space of the foundation assembly. In exemplary embodiments, the sleeping system further includes a flexible conduit disposed in the air passage between the top of the mattress and the aperture in the foundation assembly. In some exemplary embodiments, the cross-bar is an engineered spring having a different density than a density of the foam insert. In some embodiments, the sleeping system further includes an air permeable sheath disposed over at least a portion of the bottom of the foundation. In one or more embodiments, the sleeping system further includes a shroud covering an interior surface of the top of the foundation assembly.

According to another aspect, the present disclosure is directed to a sleeping system defining at least one sleeping area and including a foundation assembly and a mattress assembly. The foundation assembly includes a top, wherein the top is enclosed and has at least one aperture defined within each sleeping area. The foundation further includes a bottom and sides extending between the top and the bottom. The sides are enclosed and define an open space with the top and the bottom. The foundation assembly also includes an air blower in proximity to each aperture and positioned in the open space adjacent the top. Each air blower has an exhaust in direct fluid communication with the aperture and an air intake open to the open space. The foundation assembly further includes an air heating and cooling mechanism for each air blower for conditioning air and a shroud covering an interior surface of the top of the foundation within the open space. The mattress assembly includes a flexible encasement dish having a base and opposing sidewalls extending from the base. The base has at least one opening defined therethough in each sleeping area. A first mattress layer of the mattress assembly is disposed within the flexible encasement dish between the sidewalls, and the first mattress layer includes a foam insert having at least one elongated slot therein and an elongated engineered spring having a different density than a density of the foam insert in each elongated slot. The first mattress layer has at least one opening defined therethrough in axial alignment with the opening defined through the base of the flexible encasement dish. The mattress assembly further includes a gel layer disposed over the first mattress layer. The gel layer has at least one opening defined therethrough in axial alignment with the openings defined through the first mattress layer and the base of the flexible encasement dish. The mattress assembly also includes an air distribution mechanism overlaying one or more fluid passages through the mattress assembly defined by the openings extending through the gel layer, first mattress layer, and the base of the flexible encasement dish. The air distribution mechanism is in fluid communication with the at least one aperture of the foundation assembly In one or more exemplary embodiments, the sleeping system further includes a control unit disposed to operate each air blower, either collectively or individually, and a wireless communication device to wirelessly provide control signals to the control unit. In some embodiments, the sleeping system further includes at least one elevation mechanism disposed adjacent the foot portion or the head portion. In exemplary embodiments, the sleeping system further includes an actuation or air motor mounted in the open space of the foundation assembly. The actuation or air motor may be in fluid communication with the fluid bladder(s).

In some exemplary embodiments, the sleeping system further includes a wireless control device, and at least one of the motors is wirelessly actuatable by the wireless control device. In embodiments, the wireless control device includes a touch screen for controlling at least one of the motor(s). In one or more embodiments, the sleeping system further includes a flexible conduit or hose extending between an opening aperture in the foam enclosure base and an aperture in the top of the foundation assembly.

In some exemplary embodiments, the engineered spring(s) has a different and/or greater density than a density of the foam insert. The engineered spring may be less compressible than the foam insert to provide additional rigidity to the foam insert at the point of the slot in which the spring is mounted. In some exemplary embodiments, the foam insert includes a plurality of slots, and an engineered spring is disposed in each of the plurality of slots. The plurality of slots and engineered springs are provided approximately in the center of the foam insert at the intersection of a head portion and a foot portion. In some embodiments, the slots and springs are provided within a center third of the foam insert defined between the head and foot portions.

In some exemplary embodiments, the wireless control device includes a computer system having one or more processors, a non-transitory computer readable medium operatively coupled to the processor; and a computer program stored on the computer readable medium and executable by the processor to cause the handheld control device to send wireless control signals to the motors and/or control unit mounted in the foundation assembly.

According to another aspect, the disclosure is directed to a method for manufacturing a sleeping system. The method includes (a) constructing a foundation assembly having a top, a bottom and sides extending between the top and the bottom to define an open space between the top, bottom and sides, (b) enclosing the top and sides of the foundation assembly, (c) forming an aperture in the top of the foundation assembly, (d) attaching an air blower having a heating and cooling mechanism to the foundation assembly so as to be adjacent the top, so that the air exhaust of the air blower is in fluid communication with the aperture and the air intake of the air blower is open to the open space, (e) providing a flexible encasement dish having a base and sidewalls about the perimeter of the base, (f) positioning a foam insert within the flexible encasement dish, (g) positioning at least one additional foam layer over the foam insert, (h) forming an opening through the base of the flexible encasement dish, the foam insert and the at least one additional foam layer, thereby forming an air passage therethrough, (i) securing the at least one additional foam layer to the foam insert, and (j) positioning the flexible encasement dish with foam insert and secured additional layers on the foundation assembly so that the air passage aligns with the aperture of the foundation assembly.

In one or more exemplary embodiments, the method further includes inserting an inflatable bladder between the foam insert and the additional foam layer. In some embodiments, first and second sleeping areas are defined on the foundation assembly and the method further includes forming an aperture for each sleeping area and attaching a separate air blower for each sleeping area in communication with the respective aperture. In some exemplary embodiments, the air blower(s) is/are attached to be in direct fluid communication with the respective aperture(s) in the foundation assembly. In some exemplary embodiments, the method further includes positioning an air distribution material over each air passage in the mattress assembly by attaching only the edges of the material to the additional layer.

In exemplary embodiments, the method further includes attaching a control unit within the open space of the foundation assembly. The control unit may be operable for controlling operation of the air blower(s) and disposed to receive wireless control signals from a wireless control device for operating the air blower. In some exemplary embodiments, a method for manufacturing a sleeping system may have any combination of the steps and features set forth herein.

According to another aspect, the disclosure is directed to a sleeping system including a mattress assembly and a foundation assembly. The mattress assembly includes a foam enclosure or encasement dish having a base and sidewalls around the perimeter of the base. A first mattress layer is disposed within the flexible encasement dish, and the first mattress layer includes a foam insert. The foundation assembly includes a top, a bottom and sides extending between the top and the bottom, with an open space formed between the top, bottom and sides. The top and sides are enclosed; the top having at least one aperture defined therein. An air blower is positioned the open space adjacent the top, and the air blower has an exhaust in fluid communication with the aperture and an air intake open to the open space.

In one or more exemplary embodiments, the foam insert includes at least one and preferably a plurality of slots formed in the foam insert and extending between the sides of the foam insert, preferably at or about the center of the foam insert. An elongated cross-bar or engineered spring may be inserted into each slot. In some exemplary embodiments, the sleeping system further includes at least one, and preferably at least two or more additional mattress layers disposed over the first mattress layer.

In some embodiments, the foam insert includes at least one opening extending through the first mattress layer and the flexible encasement dish and in fluid communication with the aperture of the foundation assembly. In one or more exemplary embodiments, the air blower includes a heating and cooling mechanism for heating or cooling air expelled through the exhaust. The foundation assembly may include at least two apertures in the top and at least two air blowers, and each air blower may be in communication with an aperture. The mattress assembly includes at least two openings extending through the first mattress layer and the foam enclosure, and each mattress opening may be in fluid communication with a respective aperture of the foundation assembly. In some exemplary embodiments, the sleeping system further includes an air distribution material or mechanism overlaying the openings in the mattress.

In one or more exemplary embodiments, the sleeping system further includes a firmness layer disposed between the first mattress layer and an additional mattress layer. The firmness layer may include an inflatable fluid bladder.

In one or more exemplary embodiments, the foundation assembly defines first and second foundation assembly sleeping areas, and each foundation assembly sleeping area has an aperture and an air motor. The mattress may define first and second mattress sleeping areas, and each mattress sleeping area may have at least one opening extending through the first mattress layer and the flexible encasement dish and in fluid communication with the aperture in the corresponding sleeping area of the foundation assembly.

According to another aspect, the present disclosure is directed to a sleeping system having a mattress and a foundation assembly. The mattress has at least two mattress sleeping areas defined thereon and the foundation assembly has at least two foundation assembly sleeping areas defined thereon. The mattress includes a foam enclosure or flexible encasement dish having a base and sidewalls around the perimeter of the base. A first mattress layer is disposed within the flexible encasement dish, wherein the first mattress layer includes a foam insert. The foam insert has at least one and preferably a plurality of slots formed therein extending between the sides of the foam insert. The slots are preferably defined at or about the center of the foam insert, and preferably within a center third of the foam insert. An elongated cross-bar or engineered spring may be inserted into each slot.

The mattress assembly further includes at least one additional mattress layer disposed over the first mattress layer, at least two openings extending through the first mattress layer and the flexible encasement dish, each mattress opening in fluid communication with a mattress sleeping area. A firmness layer is disposed between the first mattress layer and the additional mattress layer. The firmness layer includes an inflatable fluid bladder for each mattress sleeping area. The foundation assembly includes a top, a bottom and sides extending between the top and the bottom, with an open space formed between the top, bottom and sides. The top and sides are enclosed and the top has at least one aperture defined in each sleeping area. For each aperture, an air blower is disposed in proximity thereto and positioned in the open space adjacent the top. Each air blower has an air heating and cooling mechanism for conditioning air, and each air blower has an exhaust in fluid communication with the aperture and an air intake open to the open space.

In one or more embodiments, the sleeping system further includes an air permeable sheath disposed over at least a portion of the bottom of the foundation assembly. In some embodiments, an air distribution material is disposed over each opening in the mattress. In some embodiments, a sleeping system a sleeping system includes any combination of the features and components set forth herein.

According to another aspect, a method for manufacturing a sleeping system includes (a) constructing a foundation assembly having a top, a bottom and sides extending between the top and the bottom to define an open space between the top, bottom and sides, (b) enclosing the top and sides of the foundation assembly, (c) forming an aperture in the top of the foundation assembly, (d) attaching an air blower having a heating and cooling mechanism to the foundation assembly so as to be adjacent the top, so that the air exhaust of the air blower is in fluid communication with the aperture and the air intake of the air blower is open to the open space, (e) providing a flexible encasement dish having a base and sidewalls about the perimeter of the base, (f) positioning a foam insert within the flexible encasement dish, (g) positioning at least one additional foam layer over the foam insert, (h) forming an aperture through the base of the flexible encasement dish, the foam insert and the additional foam layer, thereby forming an air passage therethrough, (i) securing the additional foam layer to the foam insert, and (j) positioning the flexible encasement dish with foam insert and secured additional layers on the foundation assembly so that the air passage aligns with the aperture of the foundation assembly.

In one or more exemplary embodiments, the method further includes inserting an inflatable bladder between the foam insert and the at least one additional layer. In some embodiments, the method further includes defining first and second sleeping areas on the foundation assembly, forming an aperture for each sleeping area and attaching a separate air blower for each sleeping area. In some exemplary embodiments the method further includes positioning air distribution material over each air passage defined by the openings in the mattress. The air distribution may be attached by securing only the edges of the material to the additional layer.

In some exemplary embodiments, the method further includes attaching a control unit within the open space of the foundation assembly, the control unit disposed for controlling operation of the air blower(s) and disposed to receive wireless control signals from a wireless control device for operating the air blower. In some embodiments, the control unit is disposed to operate each air blower, either collectively or individually. In some embodiments, a wireless communication device is provided to wirelessly provide control signals to the control unit. In some exemplary embodiments, a method for manufacturing a sleeping system may have any combination of the steps and features set forth herein.

In some embodiments, the sleeping system further includes at least one elevation mechanism disposed adjacent the foot portion and/or the head portion. In exemplary embodiments, the sleeping system further includes a firmness mechanism motor mounted in the open space of the foundation assembly. The additional motor may be in fluid communication with the fluid bladder(s).

In some exemplary embodiments, the sleeping system further includes a wireless control device, and at least one of the motors is wirelessly actuatable by the wireless control device. In embodiments, the wireless control device includes a touch screen for controlling at least one of the motor(s). In one or more embodiments, the sleeping system further includes a flexible conduit or hose extending between an opening aperture in the foam enclosure base and an aperture in the top of the foundation assembly.

In some exemplary embodiments, the engineered spring(s) has a different and/or greater density than a density of the foam insert. The engineered spring may be less compressible than the foam insert to provide additional rigidity to the foam insert at the point of the slot in which the spring is mounted. In some exemplary embodiments, the foam insert includes a plurality of slots, and an engineered spring is disposed in each of the plurality of slots. The plurality of slots and engineered springs are provided approximately in the center of the foam insert at the intersection of a head portion and a foot portion. In some embodiments, the slots and springs are provided within a center third of the foam insert defined between the head and foot portions.

In some exemplary embodiments, the wireless control device includes a computer system having one or more processors, a non-transitory computer readable medium operatively coupled to the processor; and a computer program stored on the computer readable medium and executable by the processor to cause the handheld control device to send wireless control signals to the motors and/or control unit mounted in the foundation assembly.

In one or more exemplary embodiments, the sleeping system may further include a shroud covering an interior surface of the top of the foundation assembly. In some embodiments, the shroud further covers at least a portion of an interior of the sides of the foundation assembly. In some embodiments, the shroud covers all interior surfaces in the open space between the four sides of the foundation assembly. In some exemplary embodiments, the shroud is disposed between the interior surface of the foundation assembly top and at least one of the air blower(s) mounted adjacent the foundation assembly top.

In some exemplary embodiments, the sleeping system further includes a separate thermoelectric device associated with each air blower. Each thermoelectric device may be positioned adjacent to or in proximity to the exhaust of the associated air blower.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A sleeping system comprising a mattress assembly and a foundation assembly,
   the mattress assembly has a top and a bottom and comprises:
   a flexible encasement dish having a base and opposing sidewalls extending from the base and at least one opening defined within the base;
   a first mattress layer disposed within the flexible encasement dish between the sidewalls, wherein the first mattress layer comprises a foam insert having a perimeter, a bottom surface and a top surface with an opening defined in the top surface;
   at least one elongate air flow passage extending from the bottom surface to the top surface along an axis through the foam insert between the opening in the top surface and the at least one opening defined within the base of the flexible encasement dish; and
   an air distribution mechanism disposed over the first mattress layer and in fluid communication with the air flow passage, the air distribution mechanism having a perimeter that is less than the perimeter of the foam insert; and
   the foundation assembly comprises:
   a top, a bottom and sides extending between the top and the bottom, with an open space formed between the top, bottom and sides, wherein the top and sides are enclosed; the top having at least one aperture defined therein; an air blower positioned in the open space adjacent the top, the air blower having an exhaust in direct fluid communication with the aperture and an air intake open to the open space.

2. The sleeping system of claim 1, wherein the foam insert has opposing sides and at least one slot formed in the foam insert and extending between the opposing sides of the foam insert; and
   an elongated cross-bar inserted into each slot.

3. The sleeping system of claim 2, further comprising at least one keyhole formed in a side of the flexible encasement dish, the keyhole comprising an opening passing laterally through the sidewall and a slot extending vertically between the opening and an upper surface of the sidewall.

4. The sleeping system of claim 1, wherein the at least one additional mattress layer comprises at least two additional mattress layers disposed over the first mattress layer.

5. The sleeping system of claim 1, wherein the at least one elongate hole is in fluid communication with the aperture of the foundation assembly and is similarly sized with respect to the aperture of the foundation assembly.

6. The sleeping system of claim 1, wherein the air blower comprises a heating and cooling mechanism for heating or cooling air expelled through the exhaust.

7. The sleeping system of claim 1, wherein the foundation assembly comprises at least two apertures defined in the top of the foundation assembly and at least two air blowers, each air blower in communication with an aperture, and wherein the mattress assembly comprises at least two elongate holes extending through the first mattress layer, and at least two openings formed in the base of the flexible encasement dish, each elongate hole in fluid communication with a respective opening in the base of the flexible encasement dish so as to form air passages through the mattress assembly, each air passage in fluid communication with a corresponding aperture of the foundation assembly.

8. The sleeping system of claim 1 further comprising a firmness layer disposed within the flexible encasement dish between the sidewalls and above the first mattress layer, the firmness layer comprising an inflatable fluid bladder.

9. The sleeping system of claim 1, further comprising a shroud disposed over at least a portion of an interior surface of the top of the foundation assembly.

10. A sleeping system comprising a mattress assembly and a foundation assembly,
the mattress assembly having a top and a bottom and defining a sleeping area thereon, the mattress assembly comprises:
a flexible encasement dish having a base and sidewalls extending substantially around the perimeter of the base and at least one opening defined within the base;
a first mattress layer disposed within the flexible encasement dish between the sidewalls, wherein the first mattress layer comprises a foam insert having a top surface, a bottom surface, opposing sides and a plurality of slots formed in the foam insert, the slots extending between the sides of the foam insert within a center third of the mattress assembly, the first mattress layer further including at least one elongate air flow passage extending from the bottom surface to the top surface along an axis through the top and bottom surfaces, the elongate air flow passage spaced apart from the plurality of slots and aligned with the opening of the flexible encasement dish, the air passage in fluid communication with the sleeping area;
an elongated cross-bar disposed in each slot;
at least one additional mattress layer disposed over the first mattress layer;
a firmness layer disposed within the flexible encasement dish between the sidewalls and between the first mattress layer and the additional mattress layer, the firmness layer comprising an inflatable fluid bladder;
the foundation assembly has at least one sleeping area defined thereon, the foundation assembly comprises:
a top, a bottom and sides extending between the top and the bottom, with an open space formed between the top, bottom and sides, wherein the top and sides are enclosed; the top having at least one aperture defined in each sleeping area; for each aperture, an air blower in proximity thereto and positioned in the open space adjacent the top, each air blower having an air heating and cooling mechanism for conditioning air and each air blower having an exhaust in direct fluid communication with the aperture and an air intake open to the open space, wherein the mattress assembly is disposed on the foundation assembly so that the aperture in the foundation assembly aligns with the air passage formed through the mattress assembly.

11. The sleeping system of claim 10, further comprising an air permeable sheath disposed over at least a portion of the bottom of the foundation.

12. The sleeping system of claim 10, further comprising an air distribution mechanism adjacent the top of the mattress assembly and overlaying one or more fluid passages through the mattress assembly.

13. The sleeping system of claim 12, wherein the air distribution mechanism includes a flow restrictor in general lateral alignment with one of the fluid passages for promoting lateral airflow through the air distribution mechanism.

14. The sleeping system of claim 10, further comprising a gel layer disposed between the top of the mattress assembly and the firmness layer.

15. The sleeping system of claim 10, further comprising at least one elevation mechanism disposed within the open space of the foundation assembly.

16. The sleeping system of claim 10, further comprising a flexible conduit disposed in the air passage between the top of the mattress and the aperture in the foundation assembly, the flexible conduit extending through the elongate hole extending through the first mattress layer.

17. The sleeping system of claim 10, wherein the cross-bar is an engineered spring having a different density than a density of the foam insert.

18. The sleeping system of claim 10, further comprising a shroud covering an interior surface of the top of the foundation assembly.

19. A sleeping system defining at least one sleeping area and comprising a foundation assembly and a mattress assembly, wherein:
the foundation assembly comprises:
a top, wherein the top is enclosed and has at least one aperture defined within each sleeping area;
a bottom;
sides extending between the top and the bottom, wherein the sides are enclosed and define an open space with the top and the bottom;
an air blower in proximity to each aperture and positioned in the open space adjacent the top, each air blower having an exhaust in direct fluid communication with the aperture and an air intake open to the open space;
an air heating and cooling mechanism for each air blower for conditioning air; and
a shroud covering an interior surface of the top of the foundation within the open space; and
the mattress assembly comprises:
a flexible encasement dish having a base and opposing sidewalls extending from the base, wherein the base has at least one opening defined therethough in each sleeping area;
a first mattress layer disposed within the flexible encasement dish between the sidewalls, wherein the first mattress layer comprises a foam insert having at least one elongated slot therein and an elongated engineered spring having a different density than a density of the foam insert in each elongated slot, and wherein the first mattress layer has at least one opening defined therethrough in axial alignment with the opening defined through the base of the flexible encasement dish;
a gel layer disposed over the first mattress layer, the gel layer having at least one opening defined therethrough in axial alignment with the openings defined through the first mattress layer and the base of the flexible encasement dish; and
an air distribution mechanism overlaying one or more fluid passages through the mattress assembly defined by the openings extending through the gel layer, first mattress layer, and the base of the flexible encasement dish, the air distribution mechanism in fluid communication with the at least one aperture of the foundation assembly.

* * * * *